US 8,630,312 B2

(12) United States Patent
Shao et al.

(10) Patent No.: US 8,630,312 B2
(45) Date of Patent: Jan. 14, 2014

(54) SYSTEM AND METHOD FOR WIRELESS COMMUNICATION OF UNCOMPRESSED VIDEO HAVING CONNECTION CONTROL PROTOCOL

(75) Inventors: Huai-Rong Shao, San Jose, CA (US);
Harkirat Singh, Santa Clara, CA (US);
Xiangping Qin, San Jose, CA (US);
Chiu Ngo, San Francisco, CA (US)

(73) Assignee: Samsung Electronics Company, Ltd., Suwon (KR)

( * ) Notice: Subject to any disclaimer, the term of this patent is extended or adjusted under 35 U.S.C. 154(b) by 1190 days.

(21) Appl. No.: 11/869,636

(22) Filed: Oct. 9, 2007

(65) Prior Publication Data

US 2008/0129879 A1    Jun. 5, 2008

Related U.S. Application Data

(60) Provisional application No. 60/872,944, filed on Dec. 4, 2006, provisional application No. 60/875,295, filed on Dec. 15, 2006.

(51) Int. Cl.
*H04J 3/00* (2006.01)

(52) U.S. Cl.
USPC ............................................ 370/476; 725/116

(58) Field of Classification Search
None
See application file for complete search history.

(56) References Cited

U.S. PATENT DOCUMENTS

| | | | | |
|---|---|---|---|---|
| 6,885,658 B1 * | 4/2005 | Ress et al. | | 370/352 |
| 7,054,296 B1 * | 5/2006 | Sorrells et al. | | 370/338 |
| 7,130,315 B1 * | 10/2006 | Brelin | | 370/476 |
| 7,965,837 B2 | 6/2011 | Kawasaki et al. | | |
| 2003/0188010 A1 * | 10/2003 | Raza et al. | | 709/238 |
| 2004/0217948 A1 | 11/2004 | Kawasaki et al. | | |
| 2005/0094640 A1 * | 5/2005 | Howe | | 370/395.1 |
| 2006/0031895 A1 | 2/2006 | Kwon et al. | | |

(Continued)

FOREIGN PATENT DOCUMENTS

EP    1478135 A1    11/2004
WO   WO 2006/101801    9/2006

OTHER PUBLICATIONS

IEEE Std 802.15.3, "Wireless Medium Access Control (MAC) and Physical Layer (PHY) Specifications for High Rate Wireless Personal Areas Networks (WPANs)," IEEE Computer Society, 2003.*

(Continued)

*Primary Examiner* — Yemane Mesfin
*Assistant Examiner* — Khoa Huynh
(74) *Attorney, Agent, or Firm* — Kenneth L. Sherman, Esq.; Michael Zarrabian, Esq.; Sherman & Zarrabian LLP

(57) ABSTRACT

A system and method for wireless communication of uncompressed audiovisual data are disclosed. The system includes a first device and a second device wirelessly connectable to each other. The first device transmits a connection control information request from the first device to the second device, wherein the connection control information request includes a request for connection control information of the second device. The connection control information includes at least one of association information, wireless video area network (WVAN) information, device capability information, audio video (A/V) format capability information, bandwidth information, A/V stream start, stop or pause command information, and device control information. The request further includes connection control information of the first device. The second device is configured to transmit a connection control information response from the second device to the first device. The connection control information response includes the connection control information of the second device.

36 Claims, 20 Drawing Sheets

(56) References Cited

U.S. PATENT DOCUMENTS

| | | | |
|---|---|---|---|
| 2006/0209745 A1* | 9/2006 | MacMullan et al. | 370/328 |
| 2006/0209890 A1 | 9/2006 | MacMullan et al. | |
| 2006/0212911 A1 | 9/2006 | MacMullan et al. | |
| 2006/0225089 A1* | 10/2006 | Ikeda | 725/25 |
| 2007/0222779 A1* | 9/2007 | Fastert et al. | 345/418 |
| 2007/0286130 A1 | 12/2007 | Shao et al. | |

OTHER PUBLICATIONS

International Search Report dated Mar. 17, 2008 in counterpart International Application No. PCT/KR2007/006218.

Korean Office Action dated Apr. 30, 2009 in counterpart Korean Patent Application No. 10-2007-0125177.

Notice of Allowance dated Nov. 17, 2009 in counterpart Korean Patent Application No. 10-2007-0125177.

High-Definition Multimedia Interface (HDMI) Specification version 1.2, Aug. 22, 2005.

IEEE Std 802.15.3, "Wireless Medium Access Control (MAC) and Physical Layer (PHY) Specifications for High Rate Wireless Personal Areas Networks (WPANs)," 2003.

1394, "AV/C Digital Interface Command Set General Specification Version 4.2," Document No. 2004006, Sep. 1, 2004.

Hachman, "CE Giants back Amimon's Wireless HDTV Tech," PCMAG.com, 1 page (Jul. 23, 2008).

"NEC develops compact millimeter-wave transceiver for uncompressed HDTV signal transmission," *NE Asia Online*, Apr. 5, 2005, (Downloaded from http://neasia.nikkeibp.com/topstory/000913 on Sep. 29, 2006.).

WirelessHD Specification Version 1.0 Overview, Oct. 9, 2007, 77 pages.

FreshNews.com, SiBEAM Receives Equity Investment from Best Buy, http://freshnews.com/print/node/261440, Jan. 4, 2010, 2 pages.

Hitachi, Ltd. et al, "High-Definition Multimedia Interface Specification Version 1.3", Jun. 22, 2006, pp. ii-238, United States.

Supplementary European Search Report dated Sep. 17, 2010 for European Patent Application No. 07851209.2-1247 from European Patent Office, pp. 1-4, Rijswijk, Netherlands.

LAN/MAN Standards Commitee of the IEEE Computer Society, "IEEE Standard for Information Technology—Telecommunications and Information Exchange Between Systems—Local and Metropolitan Area Networks—Specific Requirements—Part 15.3: Wireless Medium Acces Control (MAC) and Physical Layer (PHY) Specifications for High Rate Wireless Personal Area Networks (WPANs), IEEE Std P802.15.3-2003", 2003, pp. 1-362, IEEE, United States.

European Examination Report dated Sep. 16, 2011 for European Patent Application No. 07851209.2-1247 from European Patent Office, pp. 1-7, Rijswijk, Netherlands.

\* cited by examiner

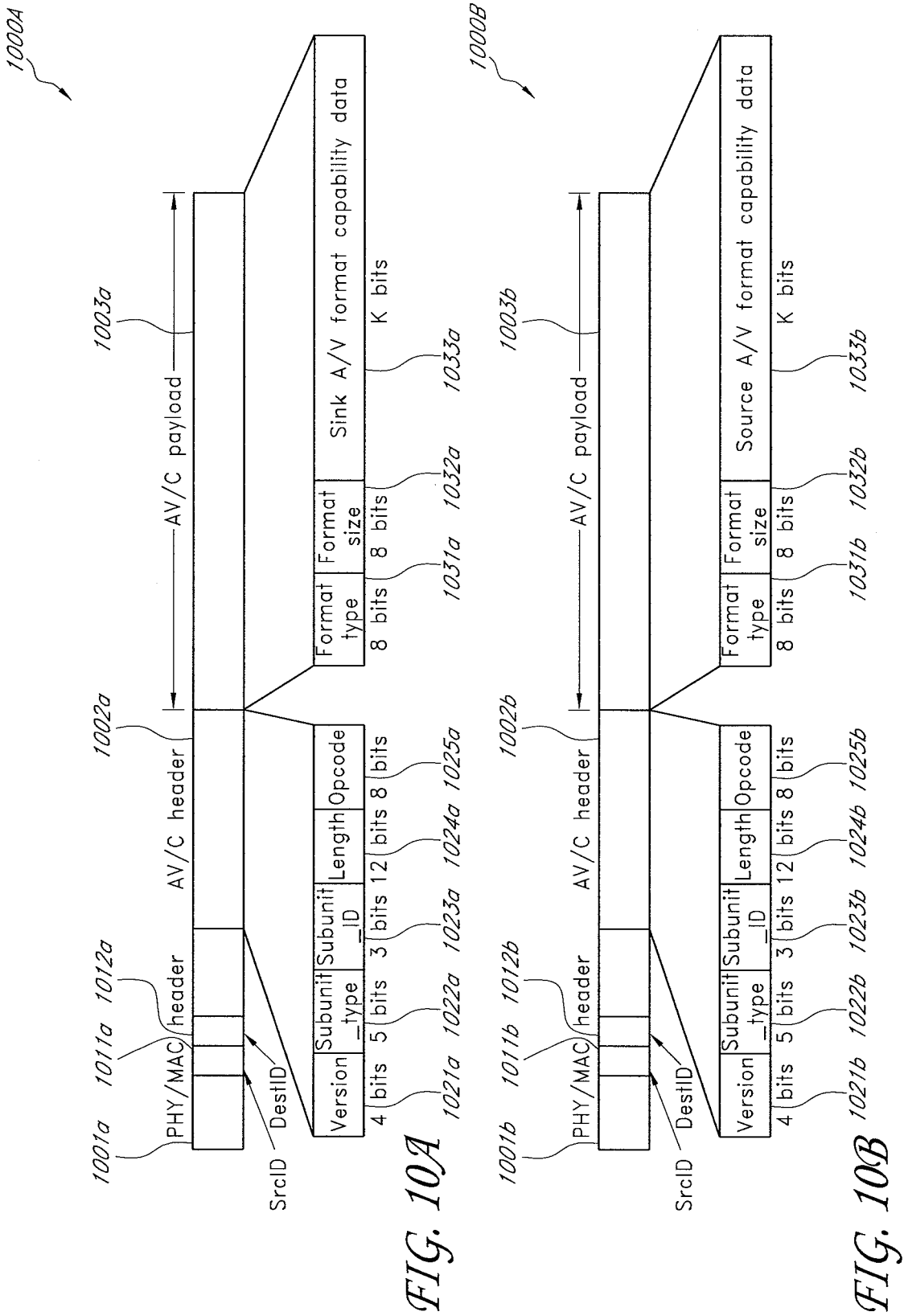

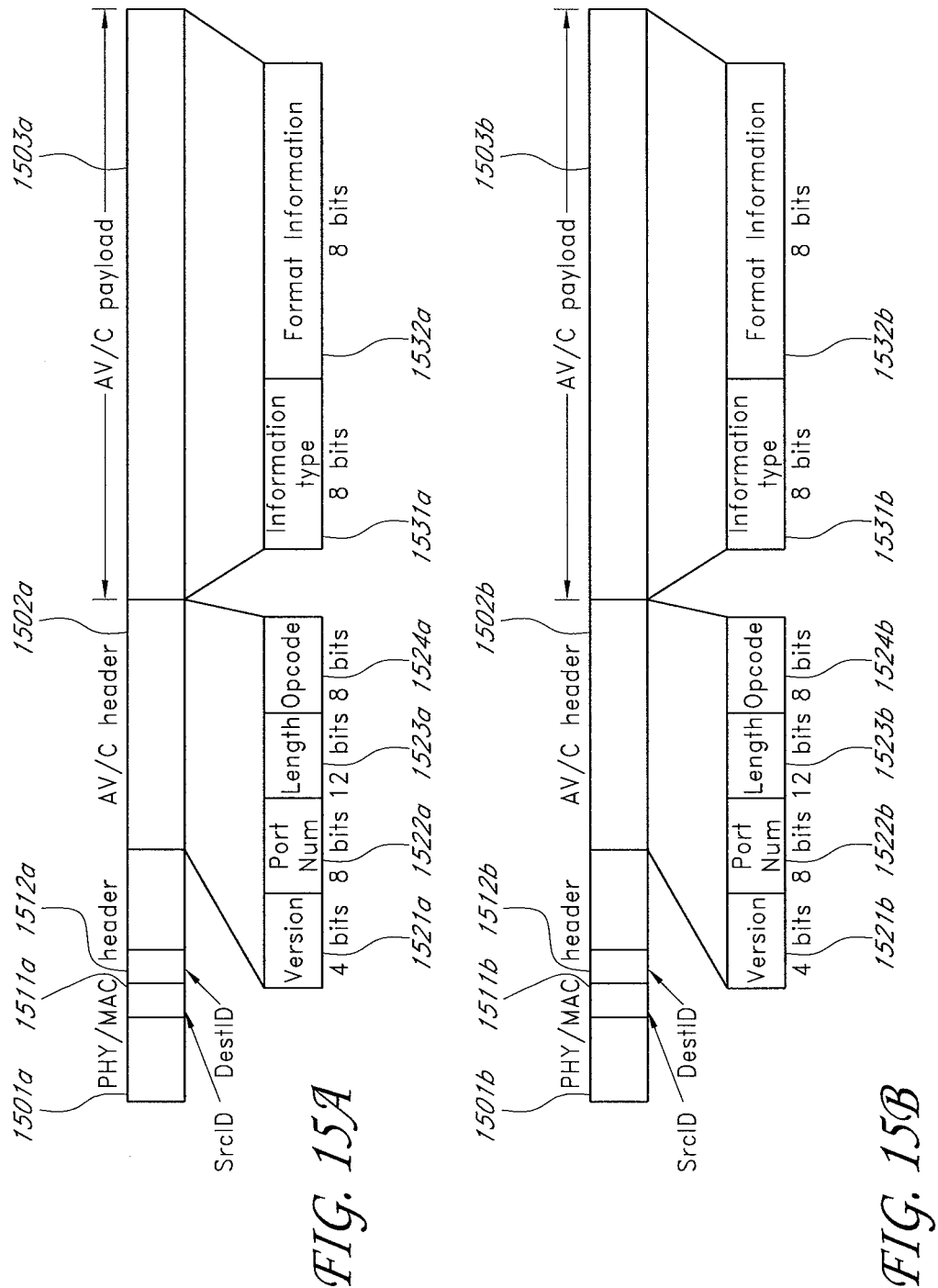

SYSTEM AND METHOD FOR WIRELESS COMMUNICATION OF UNCOMPRESSED VIDEO HAVING CONNECTION CONTROL PROTOCOL

CROSS-REFERENCE TO RELATED APPLICATIONS

This application claims the priority benefit under 35 U.S.C. §119(e) of U.S. Provisional Patent Applications No. 60/872,944, filed on Dec. 4, 2006, and No. 60/875,295, filed on Dec. 15, 2006, the disclosures of which are incorporated herein by reference.

BACKGROUND OF THE INVENTION

1. Field of the Invention

The present invention relates to wireless transmission of audiovisual data, and particularly to transmission of uncompressed high definition video data over wireless channels.

2. Description of the Related Technology

With the proliferation of high quality video, an increasing number of electronic devices, such as consumer electronic devices, utilize high definition (HD) video which can require about 1 Gbps (gigabits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices which do not have the bandwidth to carry the uncompressed HD signals are connected to the network.

Transfer of uncompressed video signals requires more use of wireless channels than that of compressed video signals because of a higher volume of data being transferred. Thus, there is a need to provide a system and a method which allow an efficient use of wireless channels while enhancing the accuracy and quality of data being transferred.

SUMMARY OF CERTAIN INVENTIVE ASPECTS

One inventive aspect is a method of wireless communication of uncompressed audiovisual data. The method comprises: transmitting at least one connection control information request from a first device to a second device in a wireless communication network, wherein the connection control information request comprises connection control information of the first device, and wherein the connection control information comprises at least one of association information, wireless video area network (WVAN) information, device capability information, audio video (A/V) format capability information, bandwidth information, A/V stream start, stop or pause command information, and device control information; transmitting at least one connection control information response from the second device to the first device; and transmitting uncompressed audiovisual data to or from one of the first and second devices.

Another inventive aspect is a wireless communication system for transmission of uncompressed audiovisual data. The system comprises: a first device and a second device, the first and second devices being configured to wirelessly communicate with each other, wherein the first device is configured to transmit at least one connection control information request from the first device to the second device, the connection control information request comprising connection control information of the first device, the connection control information comprising at least one of association information, wireless video area network (WVAN) information, device capability information, audio video (A/V) format capability information, bandwidth information, A/V stream start, stop or pause command information, and device control information, and wherein the second device is configured to transmit at least one connection control information response from the second device to the first device.

Yet another inventive aspect is a wireless communication device for transmission of uncompressed audiovisual data. The device comprises: means for storing connection control information of the wireless communication device; means for transmitting uncompressed audiovisual data over a wireless channel to another wireless communication device; and means for generating a connection control information request over a wireless channel to the other wireless communication device, wherein the connection control information request comprises connection control information of the wireless communication device, wherein the connection control information comprises at least one of association information, wireless video area network (WVAN) information, device capability information, audio video (A/V) format capability information, bandwidth information, A/V stream start, stop or pause command information, and device control information.

Another inventive aspect is a wireless communication system for transmission of uncompressed audiovisual data. The system comprises: a plurality of wireless devices, each configured to send and/or receive uncompressed audiovisual data over a wireless channel, each of the wireless devices comprising a media access control (MAC) layer and an application layer; and a coordinator configured to wirelessly provide coordination over the MAC layers of the wireless devices, wherein the coordinator is further configured to wirelessly provide coordination over the application layers of the wireless devices, wherein the coordinator is configured to exchange connection control information with the wireless devices, and wherein the connection control information comprises at least one of association information, wireless video area network (WVAN) information, device capability information, audiovidual (A/V) format capability information, bandwidth information, A/V stream start, stop or pause command information, and device control information.

Another inventive aspect is a method of wireless communication of uncompressed audiovisual data. The method comprises: determining whether an originator needs to acquire format information of a destination device directly from the destination device; exchanging a format information request and a format information response between the originator and the destination device if the originator needs to acquire the format information of the destination device directly from the destination device; exchanging a connection start request and a connection start response between the originator and the destination device; and transmitting audiovisual data between the originator and the destination device.

Another inventive aspect is a method of wireless communication of uncompressed audiovisual data. The method comprises: sending a format information response from a destination device to an originator only if a format information request from the originator is received at the destination device; receiving a connection start request at the destination device from the originator; sending a connection start response from the destination device to the originator; and communicating audiovisual data between the originator and the destination device, wherein each of the connection start request and the connection start response does not include format information.

Another inventive aspect is a wireless communication system for transmission of uncompressed audiovisual data. The system comprises: a first device and a second device, the first and second devices being configured to wirelessly communicate with each other, wherein the first device is configured to determine whether the first device needs to acquire format information of the second device directly from the second device, wherein the first and second devices are configured to exchange a format information request and a format information response therebetween if the first device needs to acquire the formation information of the second device directly from the second device, wherein the first and second devices are configured to exchange a connection start request and a connection start response therebetween, and wherein the first and second devices are further configured to transmit audiovisual data therebetween.

Another inventive aspect is a wireless communication device for uncompressed audiovisual data, the device being capable of wirelessly communicating with another wireless communication device. The device comprises: means for determining whether there is a need to acquire format information of the other device directly from the other device; means for transmitting a format information request to the other device if there is a need to acquire the formation information of the other device directly from the other device; means for transmitting a connection start request to the other device; and means for communicating audiovisual data with the other device.

Another inventive aspect is a wireless communication device for uncompressed audiovisual data, the device being capable of wirelessly communicating with another wireless communication device. The device comprises: means for transmitting a format information response only if a format information request from the other device is received; means for transmitting a connection start response to the other device upon receiving a connection start request; and means for communicating audiovisual data with the other device, wherein each of the connection start request and the connection start response does not include format information.

BRIEF DESCRIPTION OF THE DRAWINGS

FIG. 10A is a frame format for one embodiment of a source A/V format request command frame.

FIG. 10B is a frame format for one embodiment of a source A/V format response command frame.

FIG. 15A is a frame format for one embodiment of an I/O format exchange request command frame.

FIG. 15B is a frame format for one embodiment of an I/O format exchange response command frame.

DETAILED DESCRIPTION OF CERTAIN INVENTIVE EMBODIMENTS

Figure 1:
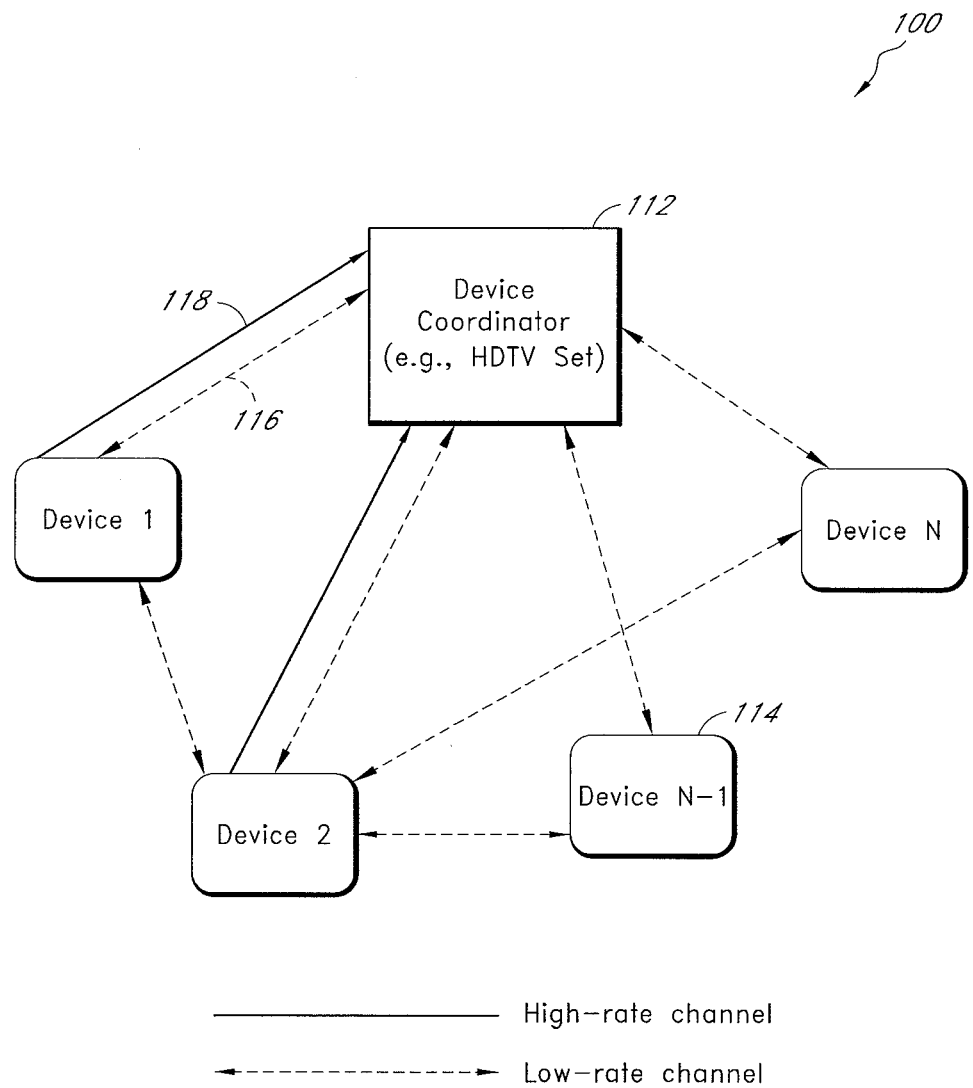
FIG. 1 is a functional block diagram of a wireless network that implements uncompressed HD video transmission between wireless devices, according to one embodiment of the system and method.

Various aspects and features of the invention will become more fully apparent from the following description and appended claims taken in conjunction with the foregoing drawings. In the drawings, like reference numerals indicate identical or functionally similar elements.

Certain embodiments provide a method and system for transmission of uncompressed HD video information from a sender to a receiver over wireless channels. Example implementations of the embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gbps bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channels. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
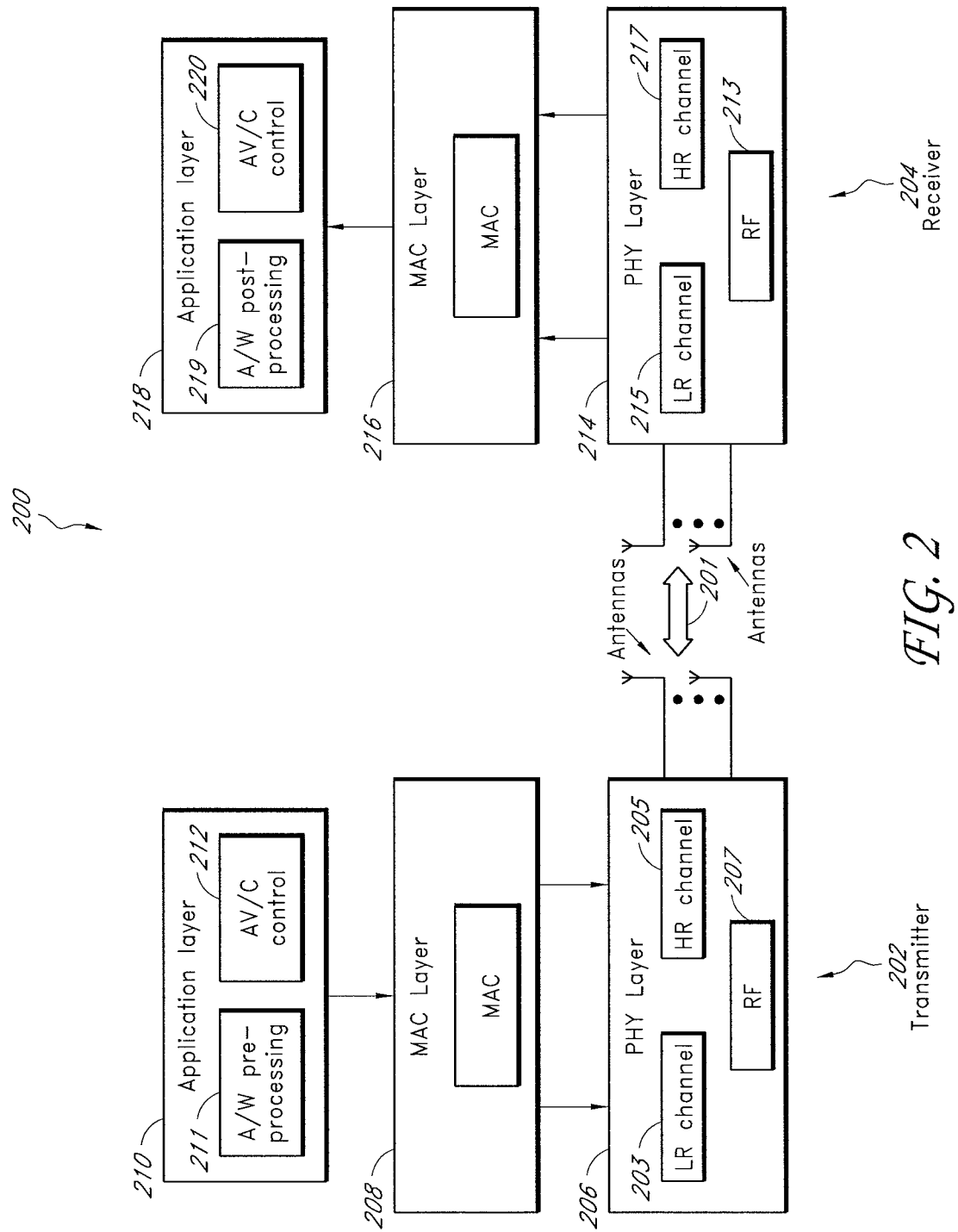
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
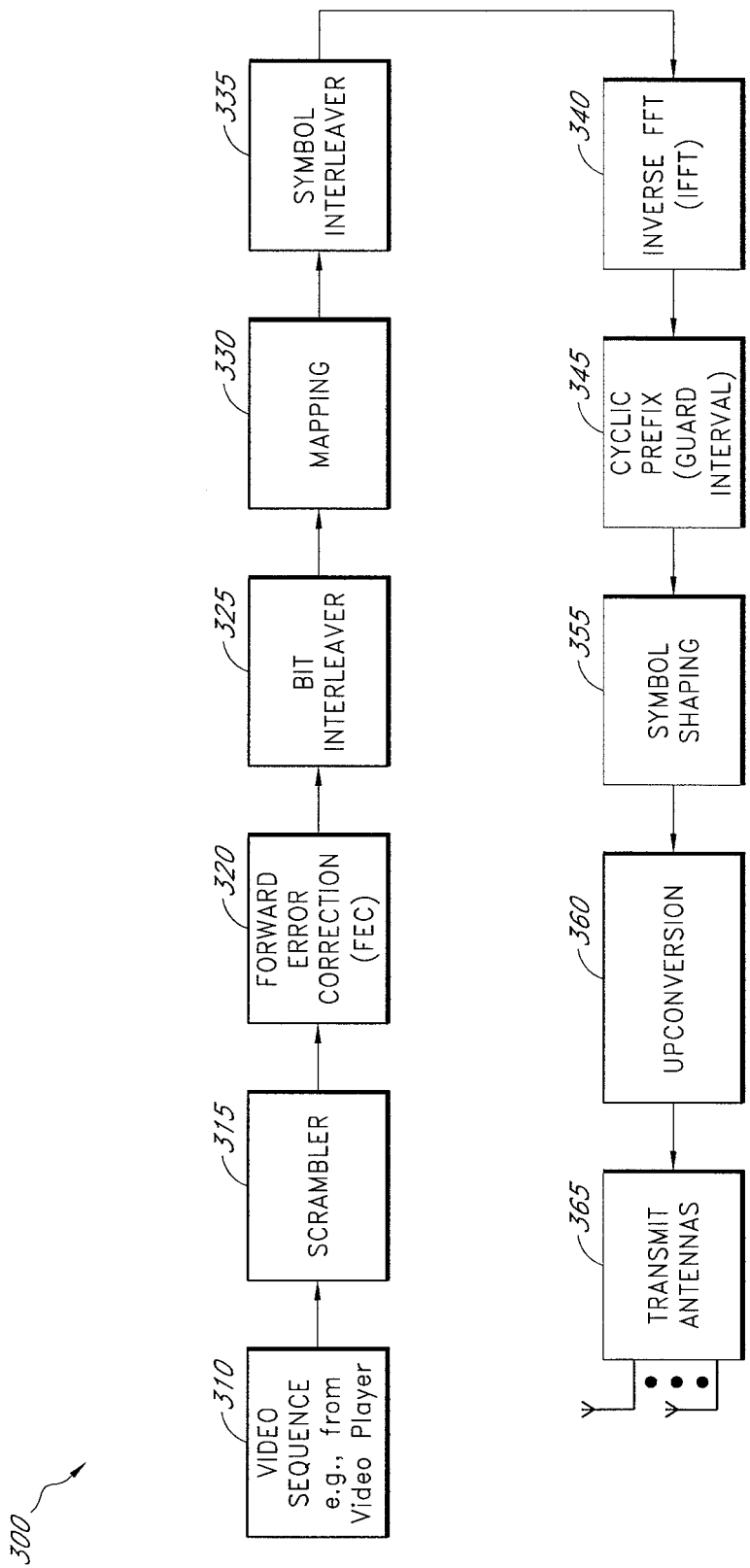
FIG. 3 is a functional block diagram of an example transmitter for transmission of uncompressed HD video over a wireless medium, according to one embodiment of the system and method.

FIG. 3 is a functional block diagram illustrating an example of a transmit chain 300 comprising modules, subsystems or devices, such as used in the PHY block 206 (FIG. 2). It will be appreciated that these modules, subsystems, or devices can be implemented using hardware, software or a combination of both. A video sequence 310 having video data, such as from a video player or other device, is input into a scrambler 315. The scrambler 315 transposes or inverts signals or otherwise encodes data to make the data unintelligible at a receiver not equipped with a corresponding descrambling device. Scrambling is accomplished by the addition of components to the original signal or the changing of some important component of the original signal in order to make extraction of the original signal difficult. Examples of the latter can include removing or changing vertical or horizontal sync pulses in video signals.

A forward error correction (FEC) subsystem 320 receives output from the scrambler and provides protection against noise, interference and channel fading during wireless data transmission. The FEC subsystem 320 adds redundant data to the scrambled video data input to the subsystem. The redundant data allows the receiver to detect and correct errors without asking the transmitter for additional data. In adding redundant data to the video data, the FEC subsystem 320 can use various error correction codes, such as a Reed-Solomon (RS) encoder and a convolutional code (CC) encoder. In other embodiments, the FEC subsystem 320 may use various other encoders, including, but not limited to, a LDPC encoder, a Hamming encoder, and a Bose, Ray-Chaudhuri, Hocquenghem (BCH) encoder.

The output of the FEC 320 is sent to a bit interleaver 325. The bit interleaver 325 rearranges a sequence of data bits received from the FEC 320. The bit interleaver 325 serves to provide further error-protection over video data transmitted over a wireless medium. The output of the bit interleaver 325 is sent to a mapper 330. The mapper 330 maps data bits to complex (IQ) symbols. The complex symbols are used to modulate a carrier for the wireless transmission described above. The mapper 330 can use various modulation schemes, including, but not limited to, Binary Phase-Shift Keying (BPSK), Quadrature Phase-Shift Keying (QPSK), and Quadrature Amplitude Modulation (QAM). In one embodiment, the mapper 330 is a QAM mapper, for example, a 16-QAM mapper or 64-QAM mapper. QAM is a modulation scheme which conveys data by modulating the amplitude of two carrier waves. The two waves, usually two orthogonal sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing the collection of such symbols.

The output of the mapper 330 is sent to a symbol interleaver 335 that rearranges the sequence of complex symbols output from the mapper. The illustrated symbol interleaver 335 is positioned after the mapper 330. In other embodiments, the symbol interleaver 335 may be positioned between the FEC and the mapper 330 in place of the bit interleaver. In such embodiments, the symbol interleaver permutes the predetermined number of bits as a symbol group. For example, in an embodiment where a QAM mapper maps four data bits to a complex symbol, the symbol interleaver is configured to interleave groups of four data bits.

In an embodiment where the symbol interleaver 335 is positioned after the mapper 330, the symbol interleaver rearranges the sequence of the symbols output from the mapper 330. In one embodiment, the symbol interleaver 335 can include a random interleaver which employs a fixed random permutation order and interleaves symbols according to the permutation order. For example, the random interleaver may use Radix-2 FFT (fast fourier transform) operation. In other embodiments, the symbol interleaver 335 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols.

The output of the symbol interleaver 335 is sent to an inverse Fast Fourier Transform (IFFT) module 340. The IFFT 340 transforms frequency domain data from the error-correcting, mapping and interleaving modules back into corresponding time domain data. The IFFT module 340 converts a number of complex symbols, which represent a signal in the frequency domain, into the equivalent time domain signal. The IFFT module 340 also serves to ensure that carrier signals produced are orthogonal. The output of the IFFT 340 is sent to a cyclic prefix adder 345 so as to decrease receiver complexity. The cyclic prefix adder 345 may also be referred to as a guard interval inserter. The cyclic prefix adder 345 adds a cyclic prefix interval (or guard interval) to an IFFT-processed signal block at its front end. The duration of such a cyclic prefix interval may be $\frac{1}{32}$, $\frac{1}{16}$, $\frac{1}{8}$, or $\frac{1}{4}$ of the original signal block duration, depending on realistic channel conditions and affordable receiver complexity.

At this point of the transmit chain 300, a preamble is part of the header 310 and prior to the IFFT-processed signal block. Generally, a preamble is selected by the designers of the system 200, such as previously described, and is standardized so that all devices of the system understand it. The use of preamble is to detect start of the packet, estimate various channel parameters, such as symbol timing, carrier frequency offset so that data reception can be done successfully.

A symbol shaping module 355 interpolates and low-pass filters the packet signal generated from the IFFT module 340, the cyclic prefix adder 345 and the preamble. The output of the symbol shaping module 355 is a complex baseband of the output signal of the IFFT module 340. An upconverter 360 upconverts the output of the symbol shaping module 355 to a radio frequency (RF) for possible meaningful transmission. A set of transmit antennas 365 transmit the signal output from the upconverter 360 over a wireless medium, such as the wireless channel 201 (FIG. 2) to a receiver. The transmit antennas 365 can include any antenna system or module suitable for wirelessly transmitting uncompressed HD video signals.

Figure 4:
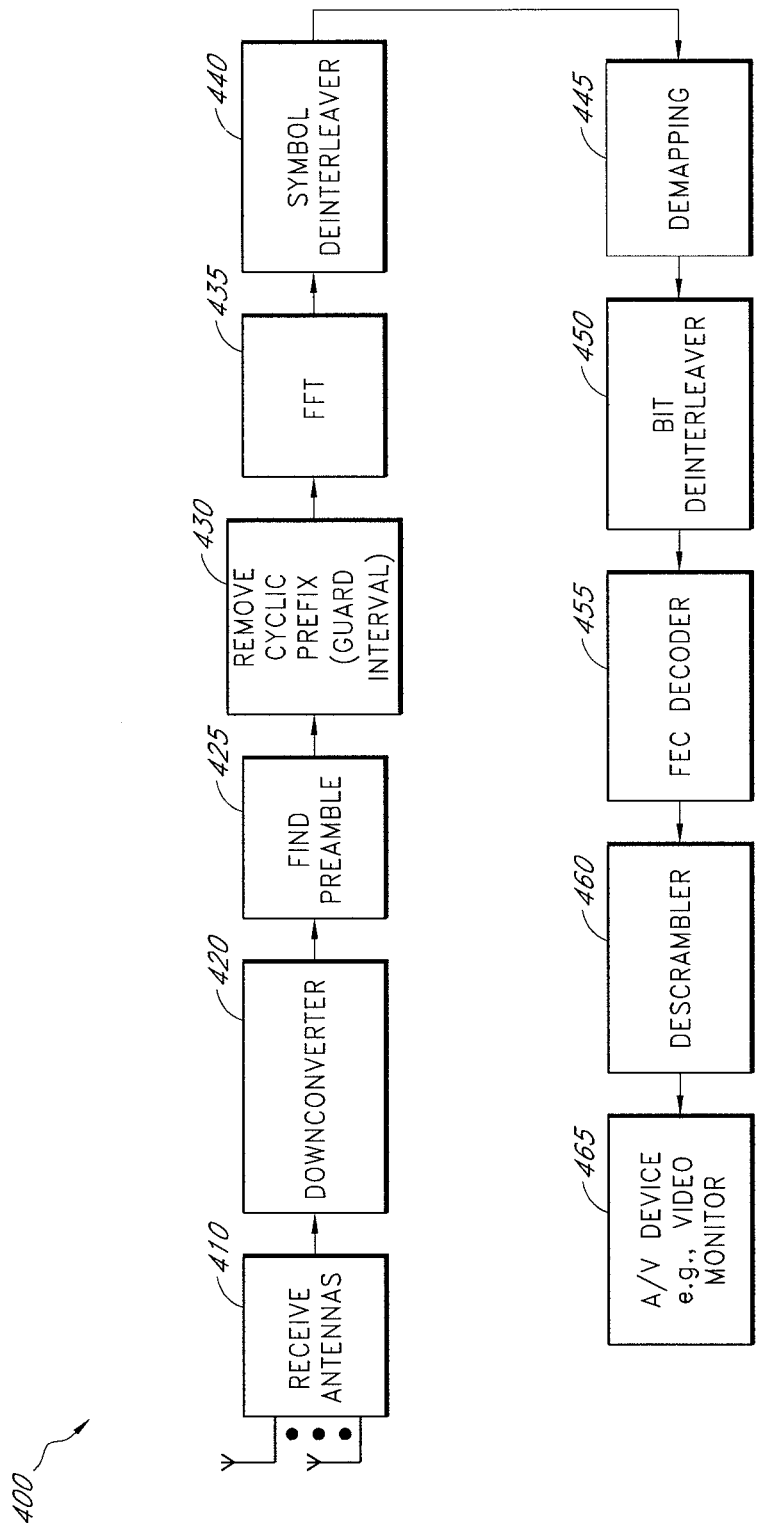
FIG. 4 is a functional block diagram of an example receiver for receipt of uncompressed HD video over a wireless medium, according to one embodiment of the system and method.
Figure 7:
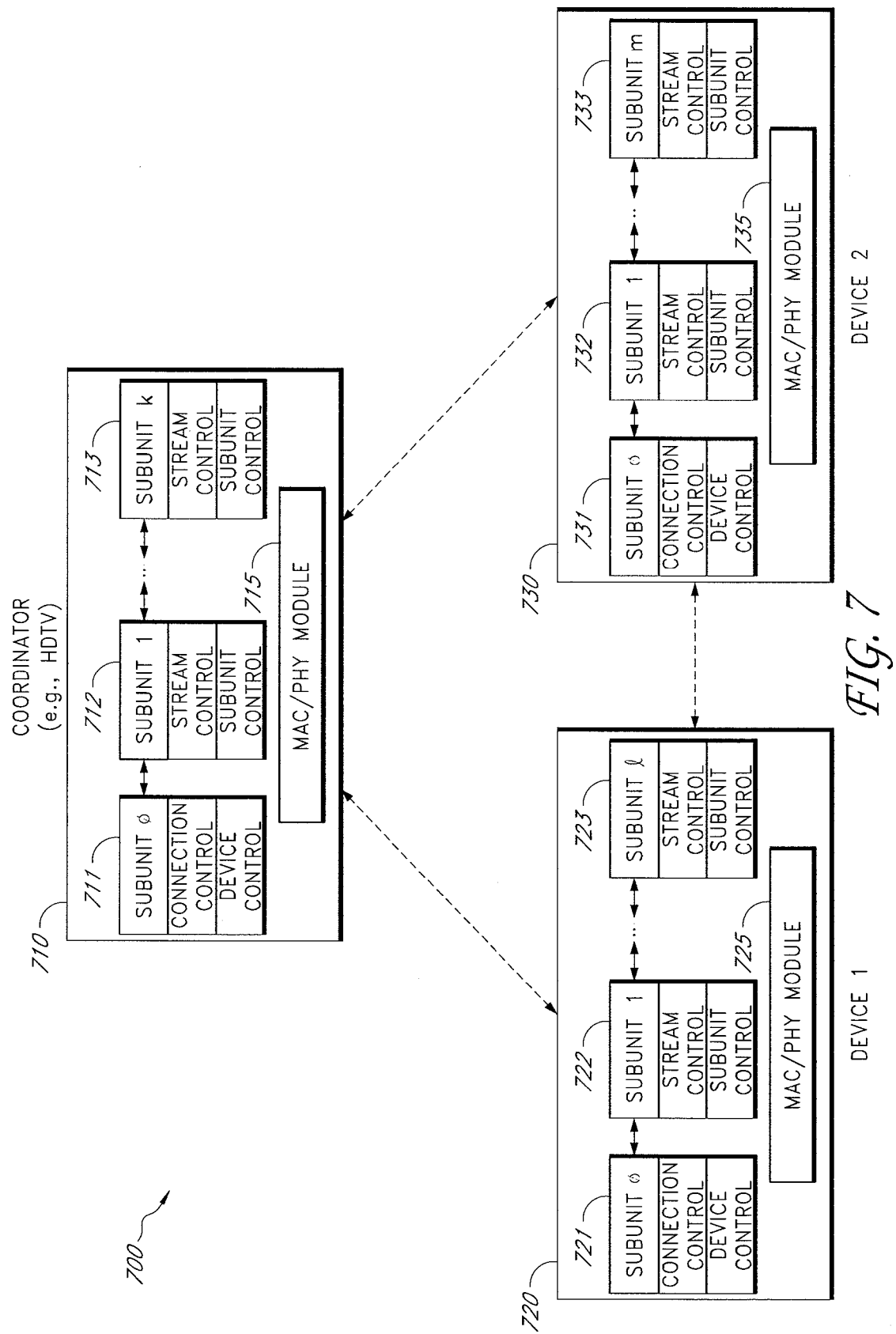
FIG. 7 is a functional block diagram of an example communication system having wireless devices for wireless transmission of audio/video data, according to one embodiment.

FIG. 4 is a functional block diagram illustrating a receiver chain 400 of modules, subsystems or devices, such as used in the PHY block 214 (FIG. 2). The receiver chain 400 generally performs an inverse process of that of the transmitter chain 300 of FIG. 3. The receiver 400 receives an RF signal via the wireless channel 201 (FIG. 2) at receive antennas 410 from the transmit antennas 365 of the transmitter chain 300. A downconverter 415 downconverts the RF signal to a signal of a frequency suitable for processing, or the baseband signal, which is already in the digital domain for easy digital signal processing. A preamble finder 420 then locates a preamble portion of the digital signal, finds the symbol starting timing, estimates the channel coefficients, estimates the carrier frequency offset and tries to compensate it via local processing. In certain embodiments, the preamble finder 420 includes a correlator and a packet start finding algorithm that can operate on the short training sequences of the preamble (FIGS. 4 and 7). After the preamble is identified by the finder 420, the preamble portion of a current signal packet is sent to a channel estimation, synchronization and timing recovery component 425, which will be further described below. A cyclic prefix remover 430 removes the cyclic prefix from the signal. Next, a fast Fourier transform (FFT) module 435 transforms the signal (a time-domain signal) into a frequency-domain signal. The output of the FFT 435 is used by a symbol deinterleaver 440 which rearranges the FFT output for a demapper 445. The demapper 445 converts the frequency-domain signal (a complex signal) into a bit stream in the time domain. A bit deinterleaver 450 rearranges the bit stream in the original bit stream sequence as before the bit interleaver 325 of FIG. 3.

Subsequently to the bit deinterleaving, a FEC decoder 455 decodes the bit stream, thereby removing redundancy added by the FEC 320 of FIG. 3. In one embodiment, the FEC decoder 455 includes a demultiplexer, a multiplexer, and a plurality of convolutional code (CC) decoders interposed between the demultiplexer and the multiplexer. Finally, a descrambler 460 receives the output from the FEC decoder 455, and then descrambles it, thereby regenerating the video data sent from the transmitter chain 300 of FIG. 3. A video device 465 can now display video using the video data. Examples of the video device include, but are not limited to, a CRT television, an LCD television, a rear-projection television and a plasma display television. It will be appreciated that audio data can also be processed and transmitted in the same manner along with video data by the wireless HD A/V system described above. The audio data can be processed and transmitted using a different wireless transmission scheme. The descrambler 460, FEC decoder 455, bit deinterleaver 450, demapper 445, symbol deinterleaver 440, FFT 435 cyclic prefix remover 430, down-converter 415 and receive antennas 410 of the receiver chain 400 perform analogous but inverse functions of the corresponding scrambler 315, FEC 320, bit interleaver 325, mapper 330, symbol interleaver 335, IFFT 340, cyclic prefix adder 345, upconverter 360 and transmit antennas 365 of the transmit chain 300.

Video signals can be represented by pixel data that encodes each pixel as several values, e.g., using a RGB color model (red, green, and blue), or a YUV (one luminance and two chrominance values). Generally, viewers are more sensitive to transmission errors or loss of data in the most significant bits (MSB) of pixel values than to errors or loss in the least significant bits (LSB) of pixel values. Thus, in one embodiment, the MSB of each pixel value (e.g. 4 out of 8 bits per color channel) is encoded with a more robust coding and/or modulation scheme than for the remaining LSB of each pixel value.

As described above with reference to FIG. 1, the wireless HD A/V system can include a low-rate (LR) channel and a high-rate (HR) channel according to one embodiment. The two channels operate in time-division duplex (TDD) mode, i.e., only one channel can be activated at any given instance.

Figure 5B:
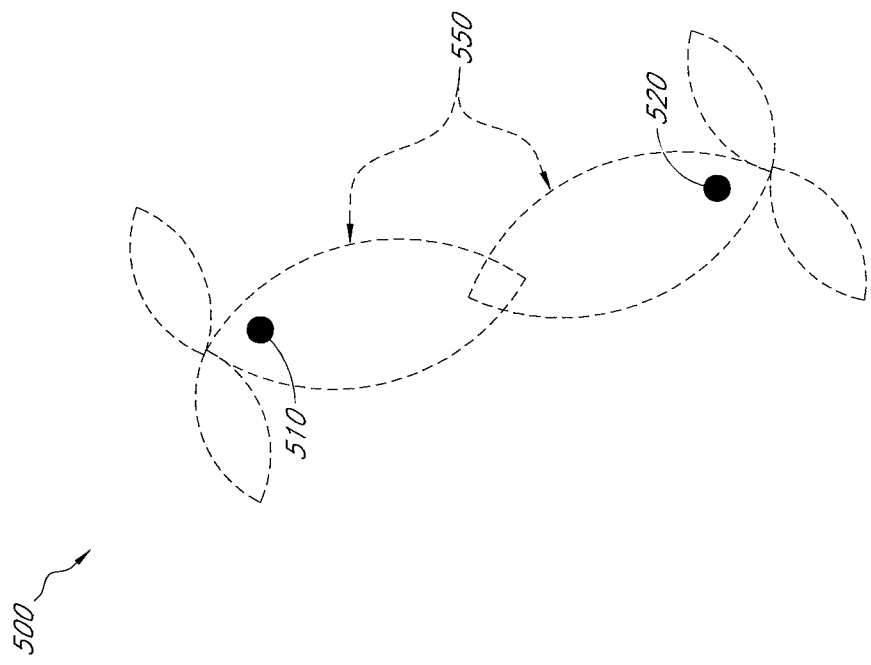
FIG. 5B is a diagram illustrating a high rate (HR) channel for uncompressed HD video transmission and a low rate (LR) channel for acknowledgment signal transmission, according to another embodiment.
Figure 5A:
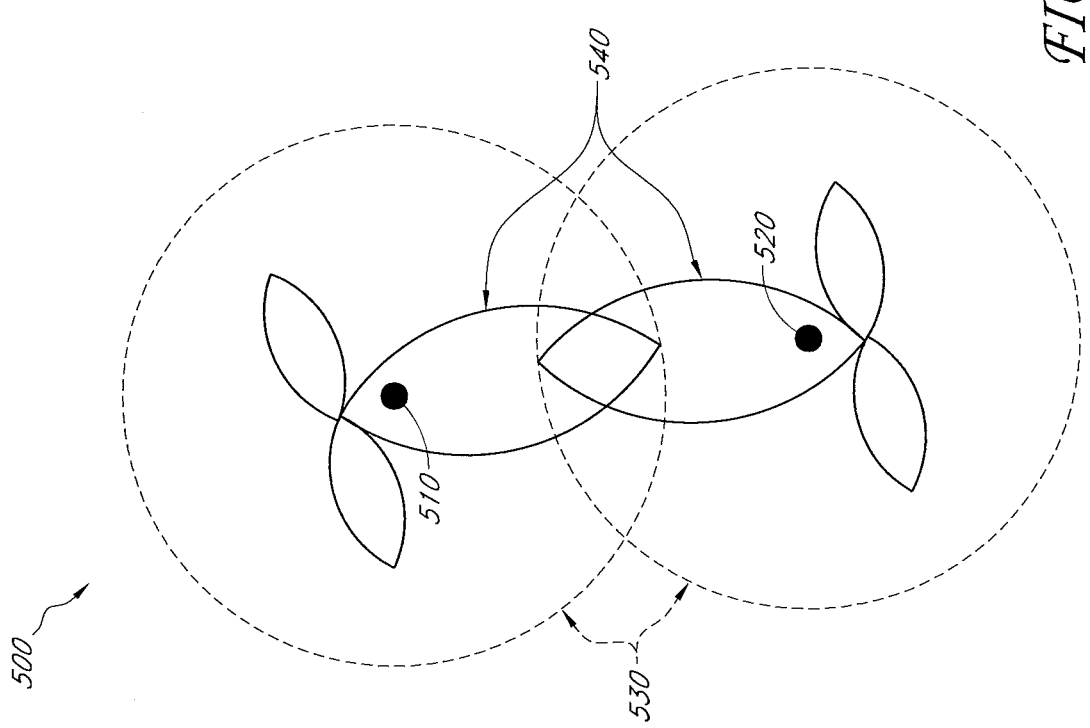
FIG. 5A is a diagram illustrating a low rate (LR) channel for uncompressed HD video transmission, according to one embodiment.

FIG. 5A is a diagram illustrating a low-rate (LR) channel established between two devices in the wireless system 500 according to one embodiment. Examples of the devices include, but are not limited to, a DVD player, an HD television, a home theater device, a media server, a printer, and an overhead projector. The illustrated system 500 includes a display device 510 (e.g., HD television, an overhead projector, etc.) and a video source device 520 (e.g., a set-top box (STB), a DVD player, a VCR, a TiVop recorder, etc.). In the illustrated embodiment, the video source device 520 is a sender of video data whereas the display device 510 is a receiver. In other embodiments, if a high rate channel between the devices 510, 520 is symmetric, the video source device 520 may also operate as a receiver whereas the display device 510 serves as a sender depending on the direction of data transmission. For example, the display device 510 (e.g., an HD television) may receive broadcast video data and send it to the video source device 520 (e.g., a DVD recorder) for storing the video data.

The LR channel is a symmetric control channel. The LR channel may operate in two modes: omni-directional mode 530 and directional (beam-formed) mode 540.

The omni-directional mode 530 is used for transmission of control data such as beacon, association and disassociation, device discovery, acknowledgment (ACK), and the like. The omni-directional mode 530 can support a data rate of about 2.5 to about 10 Mbps. The omni-directional mode 530 can be established using any suitable omni-directional antennas. The omni-directional antennas are configured to radiate power substantially uniformly in all directions. Examples of the omni-directional antennas include, but are not limited to, a whip antenna, a vertically oriented dipole antenna, a discone antenna, and a horizontal loop antenna.

The directional mode 540 can be used for transmitting low-volume data, for example, audio data. The directional mode 540 may support a data rate of about 20 to about 40 Mbps. The directional mode 540 can be established by forming a beam between the two devices 510, 520 in the system. It will be appreciated that any suitable directional antennas can be adapted for beam-forming. A skilled technologist will appreciate that various communication technologies can be adapted for implementing the directional or omni-directional modes.

FIG. 5B is a diagram illustrating an asymmetric directional channel 550 established between a display device 510 (e.g., a digital TV (DTV)) and a video source device 520 (e.g., a set-top box (STB), a DVD player (DVD)) in the wireless system 500 according to one embodiment. The directional channel can include a high rate (HR) channel and a low rate (LR) channel. The channel 550 can be established by forming a beam between the devices 510, 520. The HR channel can be used for transmission of uncompressed video data from the video source device 520 to the display device 510. The HR channel may support a data rate of about 3 to about 4 Gbps. The packet transmission duration on the HR channel can be about 100 μs to about 300 μs. In the illustrated embodiment, the display device 510 can send ACK to the video source device 520 via the LR channel after receiving video data from the video source device 520.

In one embodiment, the wireless communication system 500 is configured to wirelessly transmit uncompressed HD television signals. The wireless communication system 500 can use 60 GHz-band mm wave technology to transmit signals at a rate of about 3 to about 4 Gbps. The wireless system 500 can use the high-rate (HR) directional channel for transmitting/receiving HD signals. The system 500 may support 1080p HD formats which requires a raw data rate of 2.98 Gbps (frame size×the number of frames per second=(1920× 1080×3×8)×60).

Figure 6:
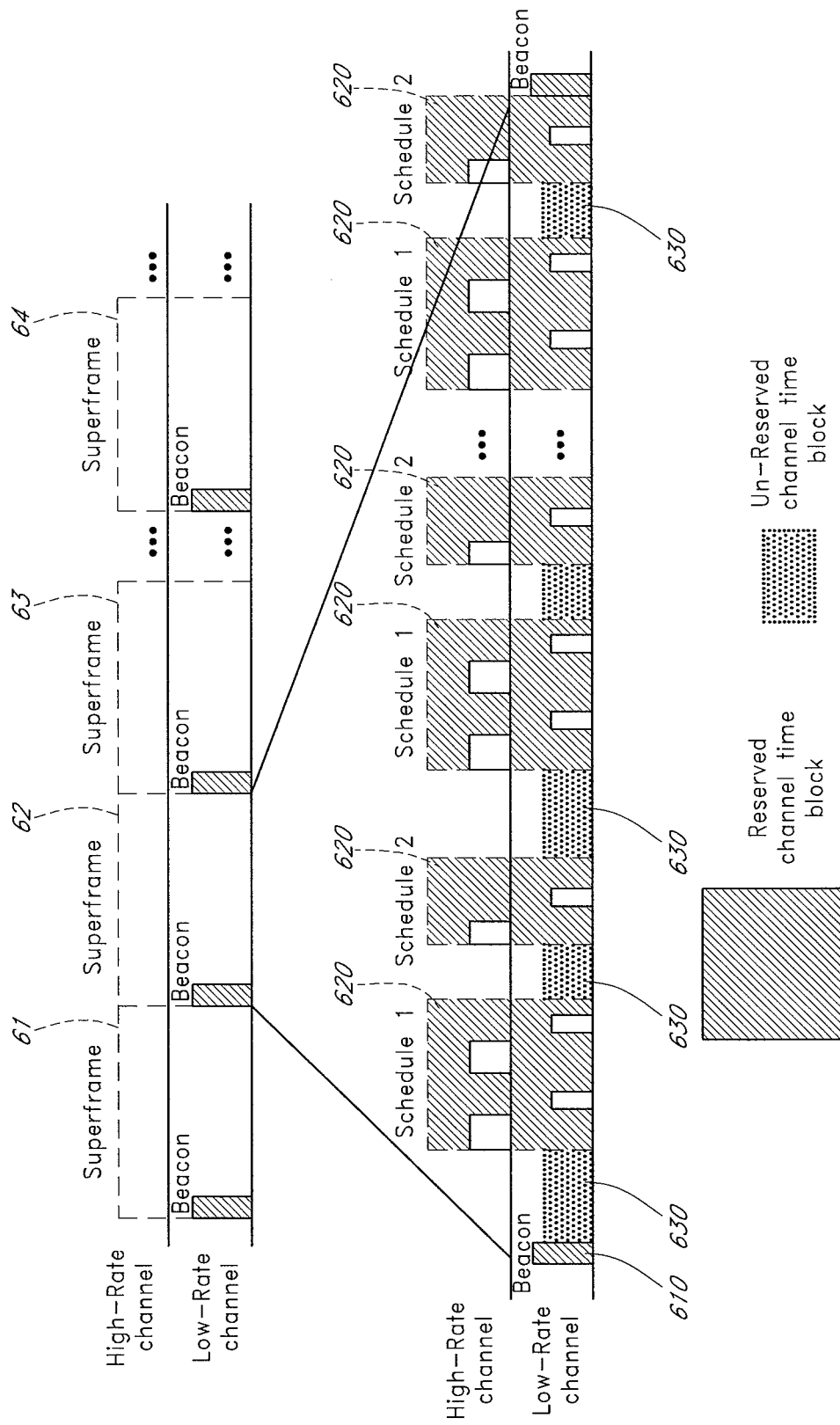
FIG. 6 is a timeline for packet transmission using Time Division Duplex (TDD) scheduling, according to one embodiment.

In one embodiment, the wireless HD A/V system described above can use a data transmission timeline shown in FIG. 6 for wireless communication between two devices in the system. One of the devices in the system can act as a controller which is responsible for managing superframes 61-64. In the illustrated embodiment, a video data sender may serve as a controller. Each of the superframes 61-64 includes a beacon frame 610, reserved channel time blocks (CTBs) 620, and unreserved channel time blocks (CTBs) 630. The beacon frame 610 is used to set the timing allocations and to communicate management information for the wireless system. The reserved channel time blocks 620 are used to transmit commands, isochronous streams, and asynchronous data connections. Each of reserved channel time blocks 620 can have single or multiple data frames. Data packets can be transmitted over the high-rate channel in the reserved channel time blocks 620. Acknowledgment signals (with or without beam-forming tracking data) can be transmitted over the low-rate channels. As shown in FIG. 6, only one of the two channels can be used for transmission at a given time. The unreserved channel time blocks 630 can be used to transmit CEC commands and MAC control and management commands on the low-rate channel. Beamforming transmission may not be allowed within the unreserved channel time blocks 630.

Connection Control Protocol

In establishing a wireless connection between devices for transmission of audio and video data, the devices communicate with each other for an effective and/or robust connection therebetween. For example, in the wireless communication system described above in connection with FIG. 2, the MAC and PHY layers of the devices establish a physical wireless channel therebetween. In addition, the application layers of the devices negotiate with each other for audio video (or audiovisual) control (AV/C). In the context of this document, the term "audio video control (AV/C)" refers to control over application layer functionalities, including, but not limited to, connection control (audio, video, and/or data stream connections) and device control (e.g., power on/off and play/stop). In the context of this document, the term "audiovisual data" or "A/V data" refers to at least one of audio and video data.

Before transmission of A/V data from one device to another in a wireless communication system, the devices can exchange connection control information with each other. The connection control information can include, but is not limited to, association (availability) information, device capability information (e.g., device category, device name, subunit type, wireless type, etc.), audio video (A/V) format capability information, wireless video area network (WVAN) information, and bandwidth information. The term "wireless video area network" generally refers to a wireless network optimized for the delivery of audio and video data with excellent quality of service (QoS) characteristics. In one embodiment, WVAN supports the wireless delivery of uncompressed, high definition video at formats up to 1080p at 60 Hz with 24 bit color and uncompressed high-quality audio at a range that is typically at least 10 m. In addition, the delivery of compressed A/V streams and data is also supported at a similar range. The WVAN information may include the name and/or identification number of a WVAN. In addition, the WVAN information can include the maximum number of devices that can be connected to the WVAN. The WVAN information can also include information indicative of whether the WVAN is a secured or non-secured network. A skilled technologist will recognize what the forgoing types of information can include or consist of. The connection control information exchange allows the devices to confirm, before the transmission, whether the devices can make a successful A/V transmission. While it is desirable to exchange all necessary connection control information between the devices before the transmission, excessive information exchange may delay the transmission of A/V data. Therefore, a system and method having a connection protocol for effective connection control information exchange is necessary.

FIG. 7 is a functional block diagram of a communication system 700 including wireless devices for wireless transmission of audio/video (A/V) data, according to one embodiment. The communication system 700 includes a coordinator 710, a first device 720, and a second device 730. In one embodiment, the coordinator 710 is a high definition television (HDTV) with coordination capability. The first and second devices 720, 730 can be any suitable types of audio and/or video devices which can be in wireless communication with each other and with the coordinator 710. In other embodiments, the number of wireless devices can vary widely depending on the system design. In the illustrated system 700, A/V transmission is possible between the coordinator 710 and one of the first and second devices 720, 730 and between the first and second devices 720, 730.

In the illustrated embodiment, each of the coordinator 710 and the first and second devices 720, 730 includes a plurality of subunits. Among the subunits, a first subunit 711, 721, 731 (e.g., subunit 0 in the illustrated embodiment) of each device 710, 720, 730 serves to provide audio video control (e.g., connection control and/or device control) with other devices. The first subunit 711, 721, 731 can also serve to provide device control among the other subunits within the device. Other subunits 712, 713, 722, 723, 732, 733 in each device can provide various functions, such as monitor, audio player (e.g., CD player), printer, DVD player, video tape recorder/player, tuner, and camera functions. Each subunit of a device can be connected to a subunit of another device individually through a device control mechanism. Each of the devices 710, 720, 730 can also include data storage for storing audio/video control information including, but not limited to, connection control information and device control information. The data storage can include any suitable memory device.

Each of the coordinator 710 and the devices 720, 730 also includes a MAC/PHY module for providing a wireless connection with the other devices. The MAC/PHY module serves to process and send A/V data in a format suitable for wireless transmission. In addition, the MAC/PHY module of one device can negotiate with those of the other devices for channel time allocation for A/V data transmission.

In the illustrated embodiment, the coordinator 710 serves as an audio video control (AV/C) coordinator as well as a MAC layer coordinator. In other words, the coordinator 710 provides coordination over both the application and MAC layer functionalities of the devices 720, 730. Certain conventional wireless systems have an AV/C coordinator and a MAC coordinator separately, which may need extra wireless control information exchange between the AV/C coordinator and the MAC coordinator. The illustrated coordinator 710 can minimize control information exchange in the system because there is no need for such extra control information exchange.

In one embodiment, at least one of the devices 720, 730 can exchange connection control information with the coordinator 710 before transmitting A/V data or control messages to either the coordinator or the other device 720 or 730. During this stage, the at least one of the devices 720, 730 can send its own connection control information to the coordinator 710. The coordinator 710 can use the information for connection between the device 720 or 730 and the coordinator 710 or for connection between the devices 720, 730. In certain embodiments, the coordinator can store the information, and use it later for a connection involving the device 720 or 730 without requesting the information again from the device. In some embodiments, the coordinator 710 can store the information of all devices in the wireless communication system 700. In such embodiments, a device in the system 700 can obtain the connection control information of other devices directly from the coordinator 710. Thus, information exchange among the devices can be minimized.

In an embodiment in which a coordinator and a device are to be connected for A/V transmission, the coordinator and the device can exchange connection control information with each other. In other embodiments in which two non-coordinator devices are to be connected for A/V transmission, the devices can exchange connection control information with each other via the coordinator. In such embodiments, if the coordinator already has the information to be exchanged, the devices can acquire the information directly from the coordinator.

During the connection control information exchange stage described above, various types of information can be exchanged among the coordinator 710 and the devices 720, 730. The connection control information can include, but is not limited to, association (availability) information, wireless video area network (WVAN) information, device capability information, format capability information, and bandwidth information. In certain embodiments, the information can include the Enhanced Extended Display Identification (E-EDID) information of a device (e.g., an audio or video sink device). The E-EDID data structure carries information on A/V formats that the device can support. Extended Display Identification Data can have a Video Electronics Standards Association (VESA) standard data format that contains basic information about a monitor and its capabilities, including vendor information, maximum image size, color characteristics, factory pre-set timings, frequency range limits, and character strings for the monitor name and serial number.

To establish an A/V transmission connection between two devices in a wireless communication system (e.g., the systems of FIGS. 1 and 7), an originator device (out of the two devices) can send a connection control information request to the other destination device to acquire desired connection control information for A/V transmission. Then, the destination device can process the request and return a connection control information response to the originator device, which allows the originator device to acquire the desired information. In the context of this document, the term "originator" or "originator device" refers to a device which initiates A/V transmission with another device. An originator can be either a source or a sink. The term "destination device" refers to a device which an originator targets for A/V transmission. A destination device can be either a sink if the originator is a source, or a source if the originator is a sink.

In some embodiments, when sending a request, an originator device can add its own connection control information (e.g., device or format capability information) to the request, thereby allowing a destination device to have the connection control information which the destination device may need for A/V transmission. This configuration may increase the volume of the request transmitted over a wireless channel between the devices. However, the destination device does not have to send another request for obtaining the information of the originator device because the originator device has already provided the destination device with the information when sending the request. In embodiments where requests have a long physical layer (PHY) preamble, this configuration reduces the overall number of information exchanges, thus reducing the wireless channel traffic and providing a faster connection between the devices. In addition, in some embodiments where the coordinator is an originator, at least part of connection control information exchange can be omitted because the coordinator can already have such information.

In other embodiments, the number of connection control request/response exchanges between an originator and a destination device can be optimized to minimize the use of a low-rate channel. The originator can be a source, and the destination device can be a sink. In another embodiment, the originator can be a sink, and the destination device can be a source. In some embodiments, each of the originator and the destination device can be a non-coordinator device. In other embodiments, one of the originator and the destination device can be a non-coordinator device, and the other of the originator and the destination device can be a coordinator. It will be appreciated that various other suitable combinations of the originator and the destination device are also possible.

In one embodiment, the originator can send an input/output format exchange request to the destination device. The destination device can send an input/output format exchange response in reply to the input/output format exchange request. If the originator already has the format information of the destination device or can acquire the information from a coordinator (which is not the destination device), the format exchange request/response can be omitted.

Then, the originator can send a connection start request to the destination device. The destination device can send a connection start response to the originator. A bandwidth reservation can be made after the input/output format exchange response is transmitted and before the connection start response is transmitted.

1. Information Request/Response Formats

Figure 8A:
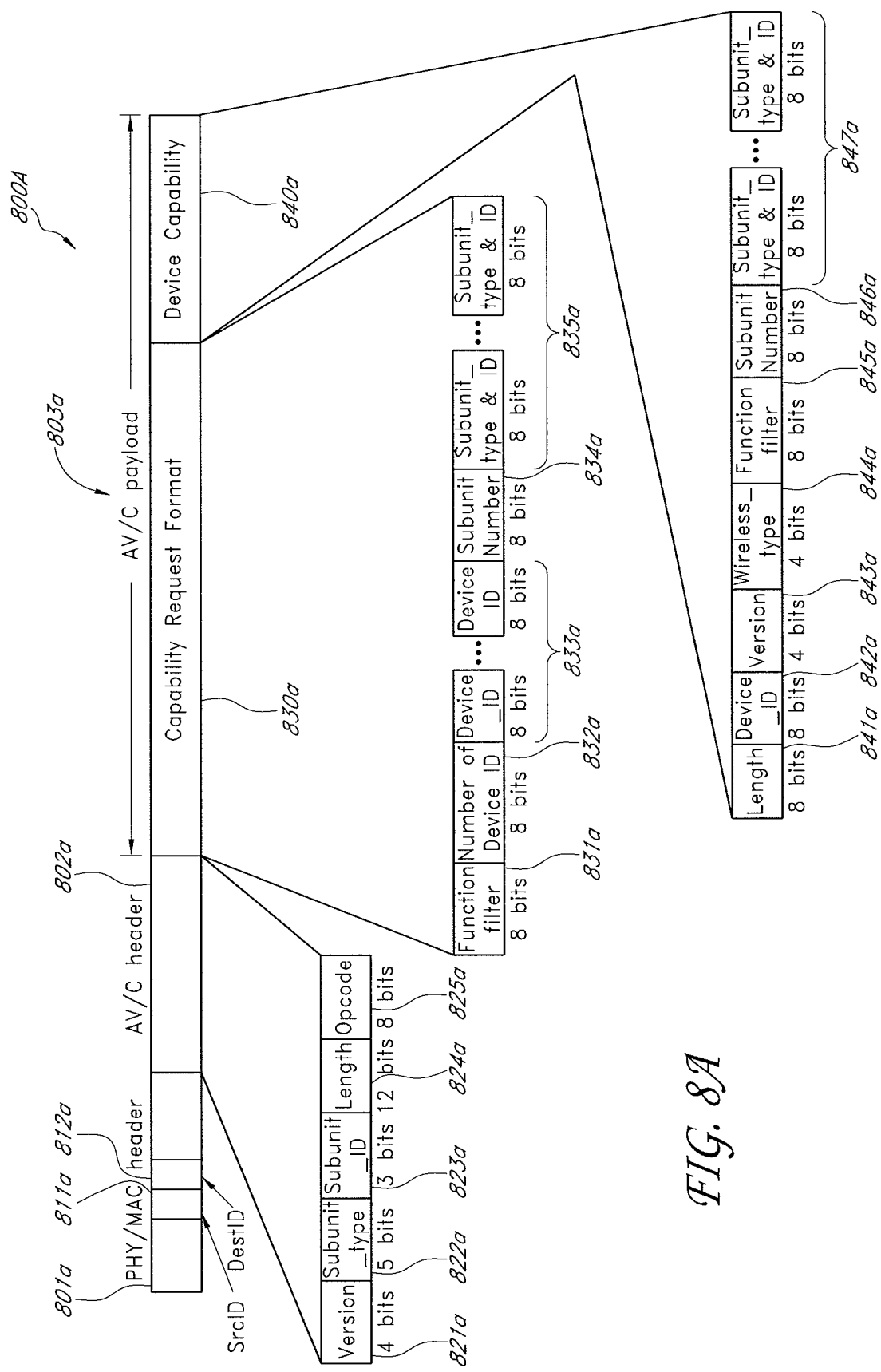
FIG. 8A is a frame format for one embodiment of a WVAN information request command frame.

Referring to FIG. 8A, one embodiment of a WVAN information request command frame 800A is described below. The WVAN information request command frame 800A includes a PHY/MAC header 801a, an audio video control (AV/C) header 802a, and an AV/C payload 803a.

The PHY/MAC header 801a can include a source identification field 811a and a destination identification field 812a. The source identification field 811a can include the identification information of a device which sends the WVAN information request 800A (hereinafter "request sender"). The destination identification field 812a can include the identification information of a device which receives the WVAN information request 800A (hereinafter "request receiver").

The AV/C header 802a can include a version field (4 bits) 821a, a subunit type field (5 bits) 822a, a subunit ID field (3 bits) 823a, a length field (12 bits) 824a, and an opcode field (8 bits) 825a. The values of the version field 821a, the subunit type field 822a, and the subunit ID field 823a are listed in Tables 1 and 2. The length field 824a is used to indicate the total length of the AV/C payload 803a. The opcode field 825a is used to identify the type of AV/C control command frame (e.g., WVAN information request/response, format capability request/response, and the like).

TABLE 1

Capability Information Format

| Parameter | Size (bits) | Value |
| --- | --- | --- |
| Version | 4 | Version of specification that a device uses |
| Wireless type | 4 | The type of high rate PHY supported, as defined in Table 3 |
| Function filter | 8 | As defined in Table 4 |
| Number of subunits | 8 | The number of subunits (N). Maximum number of subunits in one device is specified as MaxNumSubunits. |
| Subunit_type & subunit_ID | 8*N | Subunit_type has 5 bits as defined in Table 2. Subunit_ID contains the ID of the subunit (3 bits). |

TABLE 2

Subunit Type Values

| Value | Subunit Type | Value | Subunit Type |
| --- | --- | --- | --- |
| 0x00 | Monitor | 0x0A | Bulletin board |
| 0x01 | Audio | 0x0B | Camera storage |
| 0x02 | Printer | 0x0C-1B | Reserved for future specification |
| 0x03 | Disc | 0x1C | Vendor Specific Module |
| 0x04 | Tape recorder/player | 0x1D | Reserved for all subunit types |
| 0x05 | Tuner | 0x1E | Subunit_type extended to next byte |
| 0x06 | Conditional access (CA) subunit | 0x1F | AV control unit (the entire unit or device) |
| 0x07 | Camera | | |
| 0x08 | Reserved for future use | | |
| 0x09 | Panel | | |

In Table 2, the conditional access (CA) subunit refers to a stand-alone subunit having functionality that is used to descramble selected scrambled services. The CA subunit can be a generic functional block or command set that is compatible with multiple conditional access and broadcast systems. The CA subunit provides the core functionality that is required to descramble selected services. The CA subunit supports commands that allow a user to select a service or group of services to be descrambled, assuming that the user has entitlement, and to query a future service for entitlement.

The AV/C payload 803a can have a capability request format field 830a and a device capability field 840a. The capability request format field 830a can include information to notify the request receiver of what information can be provided in a WVAN information response command. The device capability field 840a can include the device capability information of the request sender.

The capability request format field 830a can include a function filter field (8 bits) 831a, a number of device ID field (8 bit) 832a, at least one device ID field (8 bits per device ID field) 833a, a subunit number field (8 bits) 834a, and at least one subunit type & ID fields (8 bits per subunit type & ID field) 835a. The function filter field 831a is used to select the devices according to video/audio/data sending or receiving capabilities. If the value of the function filter 831a for a device is ff1, and the value of the function filter in a WVAN information request command is ff2, the connection control information of the device can be not selected if ff1 binary AND ff2 is zero. The value of the function filter in a WVAN information response command can be set to "0xFF" if the function filter is not used for device selection. For example, if a device desires to obtain the capability information of all other devices which can only support video receiving, it can set ff2 in the function filter field 831a of a WVAN information request command to "01000000" in binary format. Exemplary values for the function filter field 831a are listed in Table 3.

TABLE 3

Function Filter

| Bit order | Indication |
|---|---|
| 7 | Sending video: set to "1" if the device can send video. |
| 6 | Receiving video: set to "1" if the device can receive video. |
| 5 | Sending audio: set to "1" if the device can send audio. |
| 4 | Receiving audio: set to "1" if the device can receive audio. |
| 3 | Sending data: set to "1" if the device can send data |
| 2 | Receiving data: set to "1" if the device can receive data |
| 1 | Reserved |
| 0 | Reserved |

The number of device ID (i.e., the total number of devices) and device ID fields 832a, 833a in the capability request format field 830a are used to select devices according to device address. If the request sender knows the device IDs of other devices, it can set the number of device ID and device ID fields 832a, 833a in the capability request format field 830a. Otherwise, the number of device ID field 832a can be set to, for example, "0x01," and the Device ID fields 833a can be set to a broadcast address of the wireless network.

The subunit number and subunit type & ID fields 834a, 835a in the capability request format field 830a are used to select devices according to the device subunit and ID. If the request sender knows the subunit types and IDs that it favors, it can set the subunit number and subunit type and ID fields 834a, 835a in the capability request format field 830a. Otherwise, the subunit number can be set to, for example, "0x00" and no subunit type & ID field can be included in the capability request format field 830a. Exemplary subunit type values are shown in Table 2.

The device capability field 840a can include a length field (8 bits) 841a, a device ID field (8 bit) 842a, a version field (4 bits) 843a, a wireless type field (4 bits) 844a, a function filter field (8 bits) 845a, a subunit number field (8 bits) 846a, and at least one subunit type & ID fields (8 bits per subunit type & ID field) 847a. The length field 841a in the device capability field 840a is used to indicate the length of the capability information of the request sender. The wireless type field 844a can have values listed on Table 4. The details of the other fields 842a, 843a, 845a-847a can be as described above with respect to those of the AV/C header 802a. In certain embodiments, the size of the payload 803a can be reduced by omitting or reducing some of the foregoing fields.

TABLE 4

Wireless Type Definition

| Value | Wireless capability |
|---|---|
| 0x0 | H0 (No high rate support) |
| 0x1 | HRX (high rate receiver) |
| 0x2 | HTX (high rate transmitter) |
| 0x3 | HTR (high rate transceiver) |
| 0x4-0xF | Reserved |

Figure 8B:
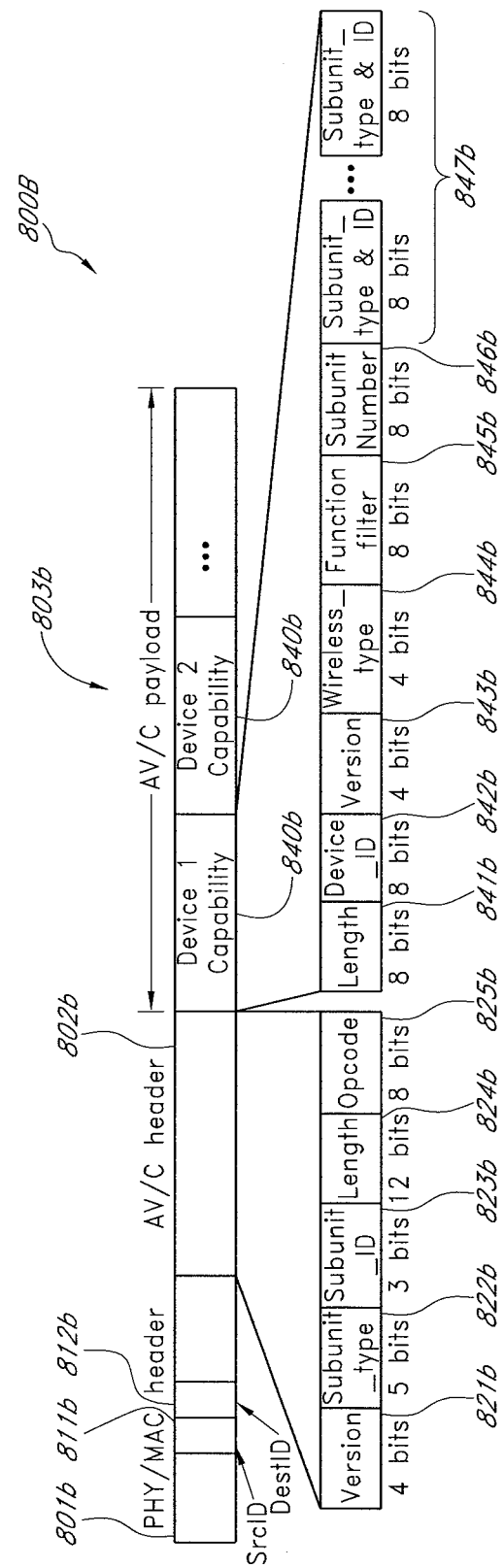
FIG. 8B is a frame format for one embodiment of a WVAN information response command frame.

Referring to FIG. 8B, one embodiment of a WVAN information response command frame 800B is described below. The WVAN information response command frame 800B includes a PHY/MAC header 801b, an AV/C header 802b, and an AV/C payload 803b. The configurations of the PHY/MAC header 801b and the AV/C header 802b can be as described above with respect to those of the PHY/MAC header 801a and the AV/C header 802a of the WVAN information request command frame 800A of FIG. 8A. In one embodiment, the subunit type field 822b in the AV/C header 802b can be set to "0x1F" according to Table 1 if the WVAN information response command frame 800B is generated and sent by an AV/C coordinator. In addition, the subunit ID field 823b in the AV/C header 802b can be set to "0." The length field 824b in the AV/C header 802b is used to identify the total length of the AV/C payload 803b. The opcode field 825b in the AV/C header 802b is used to identify the type of the AV/C control command frame.

The WVAN information response command can carry the device capability information of one or more devices in the AV/C payload 803b. The AV/C payload 803b can include one or more device capability fields 840b, as shown in FIG. 8B. Each of the device capability fields 840b can include a length field (8 bits) 841b, a device ID field (8 bit) 842b, a version field (4 bits) 843b, a wireless type field (4 bits) 844b, a function filter field (8 bits) 845b, a subunit number field (8 bits) 846b, and at least one subunit type & ID fields (8 bits per subunit type & ID field) 847b. The illustrated AV/C payload field 803b includes the capability information of multiple devices. The length field 841b in each of the device capability fields 840b is used to indicate the length of the capability information of the device of interest. The wireless type field 844b can have values listed on Table 4. The configurations of the other fields 842b, 843b, 845b-847b can be as described above with respect to those of the WVAN information request command frame 800A of FIG. 8A.

Figures 9A, 9B:
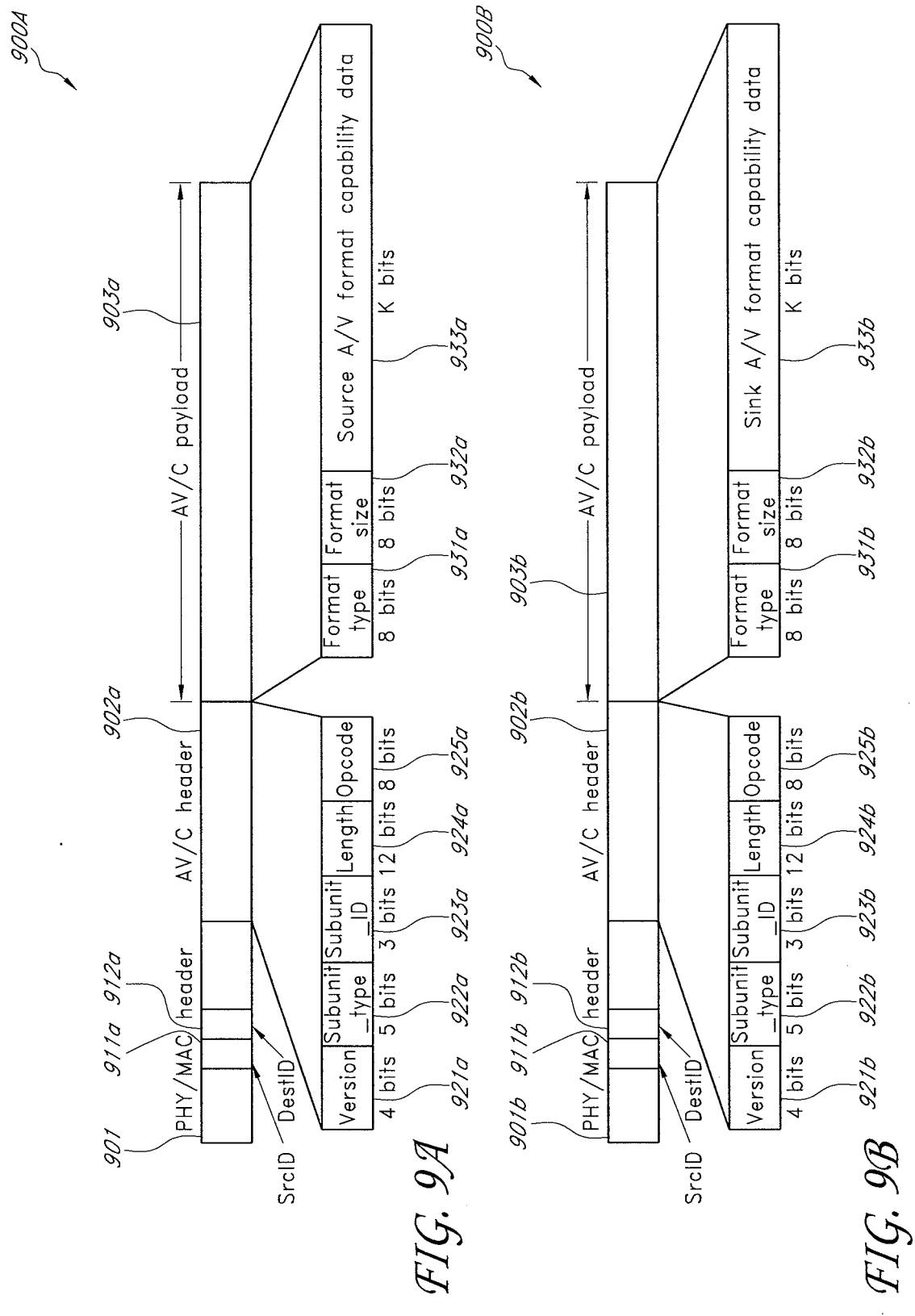
FIG. 9A is a frame format for one embodiment of a sink A/V format capability request command frame.
FIG. 9B is a frame format for one embodiment of a sink A/V format capability response command frame.

Referring to FIG. 9A, one embodiment of a sink A/V format capability request command frame 900A is described below. The illustrated sink A/V format capability request command frame 900A includes a PHY/MAC header 901a, an AV/C header 902a, and an AV/C payload 903a. The configurations of the PHY/MAC header 901a and the AV/C header 902a can be as described above with respect to those of the WVAN information request command frame 800A of FIG. 8A. The opcode field 925b of the AV/C header 902a can be used to indicate whether the request 900A is a sink or source format capability request.

The AV/C payload 903a can include a format type field (8 bits) 931a, a format size field (8 bits) 932a, and a source A/V format capability data field 933a. The format type field 931a is used to indicate the type of source A/V format capability data. The format type can be set to "0x01" if E-EDID data is carried in the payload 903a, and other values can be reserved for other uses. The format size field 932*a* is used to indicate the length of the source A/V format capability data. The source A/V format capability data field 933*a* contains the format capability data of the source (request sender) which generates and sends the sink A/V format capability request 900A.

Referring to FIG. 9B, one embodiment of a sink A/V format capability response command frame 900B is described. The sink A/V format capability response command frame 900B can include a PHY/MAC header 901*b* and an AV/C header 902*b*, and an AV/C payload 903*b*. The configurations of the PHY/MAC header 901*b* and the AV/C header 902*b* can be as described above with respect to those of the WVAN information request command frame 800A of FIG. 8A.

The AV/C payload 903*b* can include a format type field (8 bits) 931*b*, a format size field (8 bits) 932*b*, and a sink A/V format capability data field 933*b*. The format type field 931*b* is used to indicate the type of sink A/V format capability data. The format type can be set to "0x01" if E-EDID data is carried in the payload 903*b*, and other values can be reserved for other uses. The format size field 932*b* is used to indicate the length of the sink A/V format capability data. The sink A/V format capability data field 933*b* contains the format capability data of the sink (response sender) which generates and sends the sink A/V format capability response 900B.

Referring to FIG. 10A, one embodiment of a source A/V format capability request command frame 1000A is described below. The illustrated source A/V format capability request command frame 1000A includes a PHY/MAC header 1001*a*, an AV/C header 1002*a*, and an AV/C payload 1003*a*. The configurations of the PHY/MAC header 1001*a* and the AV/C header 1002*a* can be as described above with respect to those of the WVAN information request command frame 800A of FIG. 8A.

The AV/C payload 1003*a* can include a format type field (8 bits) 1031*a*, a format size field (8 bits) 1032*a*, and a sink A/V format capability data field 1033*a*. The format type field 1031*a* is used to indicate the type of sink A/V format capability data in the payload 1003*a*. In an embodiment where A/V formats under High-Definition Multimedia Interface (HDMI) Specification (version 1.2, Aug. 22, 2005) which is incorporated herein by reference are used for A/V transmission, the format type can be set to, for example, "0x01" if Auxiliary Video Information (AVI) InfoFrame is carried in the sink A/V format capability data field 1033*a* of the payload 1003*a*, or "0x02" if Audio InfoFrame is carried therein. The format size field 1032*a* is used to indicate the length of the sink A/V format capability information. The sink A/V format capability data field 1033*a* can contain the format capability data of the sink (request sender).

Referring to FIG. 10B, one embodiment of a source A/V format capability response command frame 1000B is described. The source A/V format capability response command frame 1000B can include a PHY/MAC header 1001*b*, an AV/C header 1002*b*, and an AV/C payload 1003*b*. The configurations of the PHY/MAC header 1001*b* and the AV/C header 1002*b* can be as described above with respect to those of the WVAN information request command frame 800A of FIG. 8A.

The AV/C payload 1003*b* can include a format type field (8 bits) 1031*b*, a format size field (8 bits) 1032*b*, and a source A/V format capability data field 1033*b*. The format type field 1031*b* is used to indicate the type of source A/V format capability data in the payload 1003*b*. For example, the format type can be set to "0x01" if Auxiliary Video Information (AVI) InfoFrame under High-Definition Multimedia Interface (HDMI) specification (version 1.2, Aug. 22, 2005) is carried in the source A/V format capability data field 1033*b* of the payload 1003*b*, or "0x02" if Audio InfoFrame under the above-mentioned specification is carried therein. The format size field 1032*b* is used to indicate the length of the source A/V format capability data. The source A/V format capability data field 1033*b* can contain the format capability information of the source (response sender).

2. Connection Control Information Request/Response Exchange

In establishing a wireless connection between two devices (e.g., a sink and a source) for uncompressed A/V data transmission, the devices can exchange various requests and responses to acquire information for the transmission and/or playback of A/V data. The information can include association information, WVAN information, device (format) capability information, and direct link support (bandwidth) information.

In one embodiment, an originator device (either a source or a sink) exchanges requests and responses with a destination device (either a sink or a source). In some embodiments, the originator device can be a coordinator. The application layer of the originator device generates and sends a request to the MAC/PHY layer of the originator device. The MAC/PHY layer of the originator device sends the request to that of the destination device over a wireless channel. Then, the application layer of the destination device processes the request, and generates and sends a response to the MAC/PHY layer of the destination device, and then to the MAC/PHY layer of the originator device over a wireless channel. A skilled artisan will appreciate that the steps described above can be implemented in any suitable manner.

In the embodiments described below, if the originator device finds that a response from the destination device indicates that the destination device is not available or suitable for A/V data transmission and/or playback, the originator device can stop any subsequent steps, and attempt connection with another device.

Figure 11:
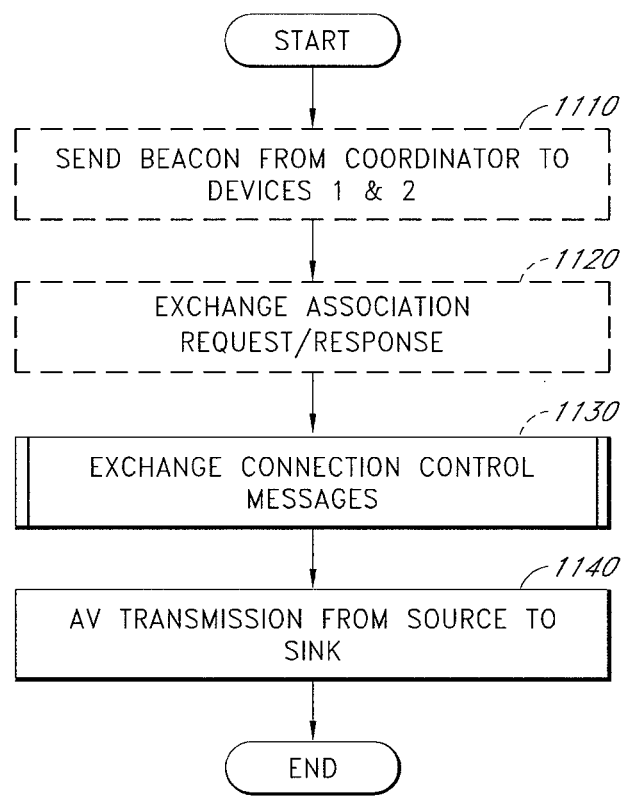
FIG. 11 is a flowchart illustrating a method of wirelessly transmitting audio/video data between devices according to one embodiment.

FIG. 11 illustrates a method of establishing a wireless A/V communication between devices according to one embodiment. In other embodiments, some blocks can be omitted, or two or more blocks can be combined. The illustrated method can be implemented with a wireless system including a coordinator, a first device (device 1), and a second device (device 2). The first and second devices are non-coordinator devices. The coordinator can be the coordinator (e.g., an HDTV) 710 of FIG. 7. The first and second devices can be the first and second devices 720, 730 of FIG. 7. The first and second devices can be any non-coordinator device which can serve as a source, sink, or both.

In block 1110, the coordinator sends a beacon signal to at least one of the first and second devices to set a reserved schedule for transmission among the devices. Then, in block 1120, one of the first and second devices exchanges an association request/response with the coordinator. In one embodiment in which the first device is to be connected to the coordinator or the second device for A/V transmission, the first device sends an association request to the coordinator. The association request can include an inquiry as to whether the coordinator or the second device is available for wireless communication with the first device. Upon receiving the association request, the coordinator determines the availability of the coordinator or the second device for communication with the first device. Then, the coordinator sends an association response to the first device. The blocks 1110 and 1120 are optional, and can be omitted.

In block 1130, the coordinator and at least one of the first and second devices exchange connection control messages with each other. The type and the number of exchanged messages depend on which two devices are to be connected for A/V transmission. In some embodiments, the coordinator and the first device are connected for A/V transmission. The coordinator can serve as a sink and the first device can serve as a source. In one embodiment, the first device can be an originator device and the coordinator can be a destination device. In another embodiment, the coordinator can be an originator device and the first device can be a destination device.

In other embodiments, the first and second devices are connected for A/V transmission. The first device can be a source and originator device, and the second device can be a sink and destination device. In certain embodiments, the first device can be a sink and originator device and the second device can be a source and destination device. It will be appreciated that various other combinations of devices for A/V transmission are also possible. Various embodiments of the block 1130 will be described below with reference to FIGS. 12A-12D.

After successful completion of the control message exchange, the two devices start A/V transmission. In block 1140, the source device transmits A/V data or streams to the sink device.

Figure 12A:
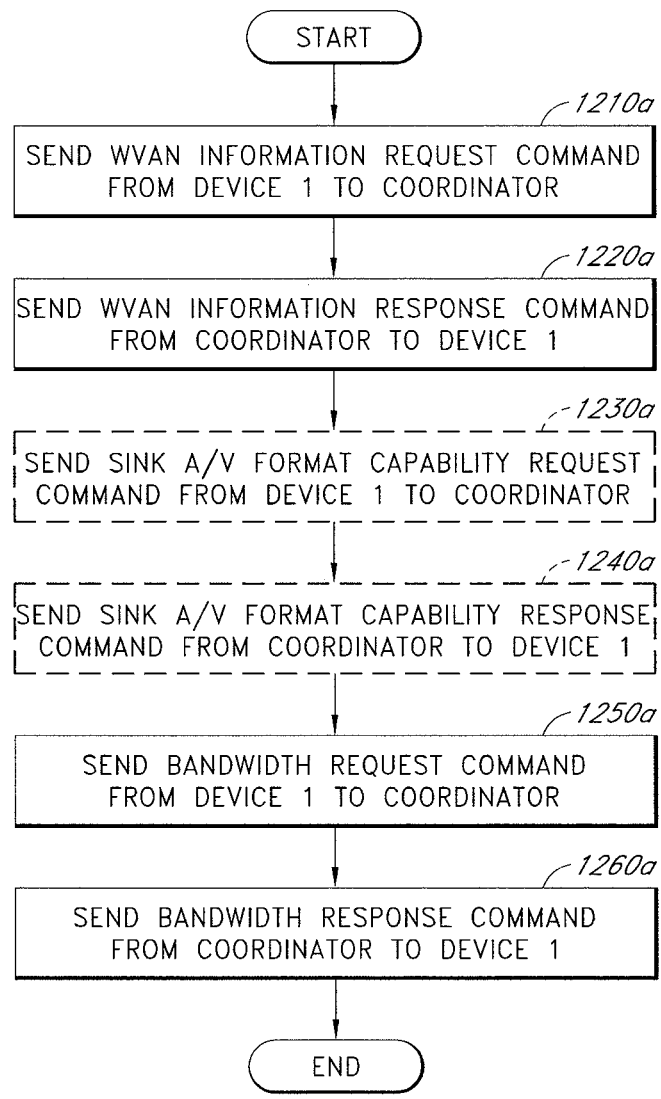
FIG. 12A is a flowchart illustrating a functional module that is a portion of the block 1130 of FIG. 11 for connecting a coordinator with a wireless device, according to one embodiment.

FIG. 12A is a flowchart illustrating a functional module that is a portion of the block 1130 of FIG. 11 for connecting the coordinator and the device 1 for A/V transmission, according to one embodiment. In the illustrated embodiment, the device 1 (e.g., a DVD player, a set-top box, etc; or the first device 720 of FIG. 7) serves as a source and originator, and the coordinator (e.g., an HDTV; or the coordinator of 710 of FIG. 7) serves as a sink. In other embodiments, some blocks can be omitted, or two or more blocks can be combined.

In block 1210a, the device 1 sends a WVAN information request command to the coordinator. The WVAN information request command can have the format shown in FIG. 8A. In block 1220a, the coordinator sends a WVAN information response command to the device 1. The WVAN information response command can have the format shown in FIG. 8B.

In block 1230a, the device 1 sends a sink A/V format capability request command to the coordinator. The sink A/V format capability request command can have the format shown in FIG. 9A. In block 1240a, the coordinator sends a sink A/V format capability response command to the device 1. The sink A/V format capability request command can have the format described above in connection with FIG. 9B. In one embodiment, the sink A/V format capability response command can include an E-EDID data structure. The blocks 1230a and 1240a are optional, and can be omitted.

In block 1250a, the device 1 sends a bandwidth request command to the coordinator. Then, in block 1260a, the coordinator sends a bandwidth response command to the device 1. In certain embodiments, the bandwidth request and response can be combined with the WVAN information request and response, respectively.

Figure 12B:
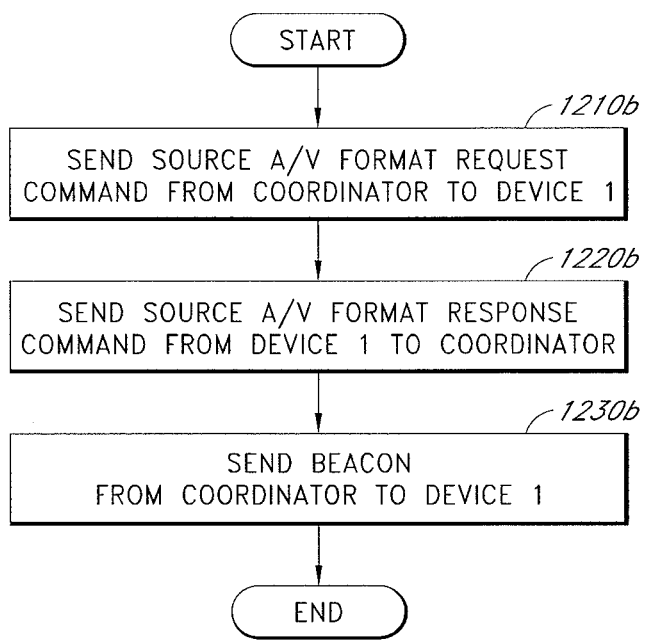
FIG. 12B is a flowchart illustrating a functional module that is a portion of the block 1130 FIG. 11 for connecting a coordinator with a wireless device, according to another embodiment.

FIG. 12B is a flowchart illustrating a functional module that is a portion of the block 1130 of FIG. 11 for connecting the coordinator and the device 1 for A/V transmission, according to another embodiment. In the illustrated embodiment, the coordinator (e.g., an HDTV; or the coordinator of 710 of FIG. 7) serves as a sink and originator. The device 1 serves as a source (e.g., a DVD player, a set-top box, etc; or the first device 720 of FIG. 7). In other embodiments, some blocks can be omitted, or two or more blocks can be combined.

In block 1210b, the coordinator sends a source A/V format request command to the device 1. The source A/V format request command can have the format described above in connection with FIG. 10A. In block 1220b, the device 1 sends a source A/V format response command to the coordinator. The source A/V format response command can have the format described above in connection with FIG. 10B. In block 1230b, the coordinator sends a beacon signal to the device 1 to announce a new reserved schedule. In the illustrated embodiment, because the coordinator has WVAN information and bandwidth information, there is no need for exchange of such information between the coordinator and the device 1.

Figure 12C:
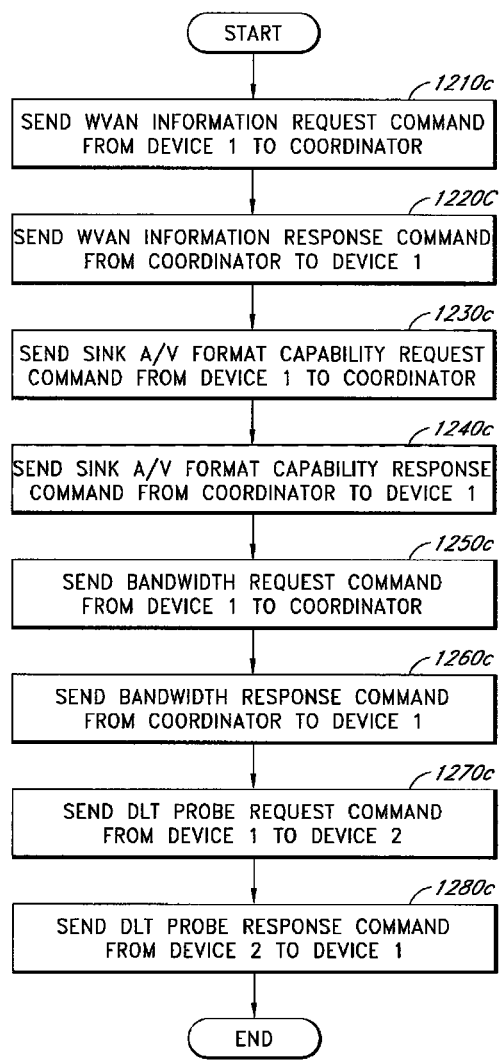
FIG. 12C is a flowchart illustrating a functional module that is a portion of the block 1130 FIG. 11 for connecting two non-coordinator wireless devices, according to another embodiment.

FIG. 12C is a flowchart illustrating a functional module that is a portion of the block 1130 of FIG. 11 for connecting two non-coordinator devices for A/V transmission, according to another embodiment. In the illustrated embodiment, one of the devices is a device 1 serving as a source and originator device (e.g., a DVD player, a set-top box, etc; or the first device 720 of FIG. 7). The other of the devices is a device 2 serving as a sink and destination device (e.g., a display, an amplifier; or the second device 730 of FIG. 7). In establishing a wireless connection, the devices use a coordinator (e.g., an HDTV; or the coordinator of 710 of FIG. 7) in the wireless network. In other embodiments, some blocks can be omitted, or two or more blocks can be combined.

In block 1210c, the device 1 sends a WVAN information request command to the coordinator. The WVAN information request command can have the format described above in connection with FIG. 8A. In block 1220c, the coordinator sends a WVAN information response command to the device 1. The WVAN information response command can have the format described above in connection with FIG. 8B.

In block 1230c, the device 1 sends a sink A/V format capability request command to the coordinator. The sink A/V format capability request command can have the format described above in connection with FIG. 9A. In block 1240c, the coordinator sends a sink A/V format capability response command to the device 1. The sink A/V format capability response command can have the format described above in connection with FIG. 9B. In the illustrated embodiment, the coordinator maintains the A/V format capability information of the device 2 (sink). Thus, the device 1 can obtain the A/V format capability information of the device 2 directly from the coordinator.

In block 1250c, the device 1 sends a bandwidth request command to the coordinator. Then, in block 1260c, the coordinator sends a bandwidth response command to the device 1. In block 1270c, the device 1 sends a DLT (Direct Link Transmission) probe request command to the device 2. In block 1280c, the device 2 then sends a DLT probe response command to the device 1.

Figure 12D:
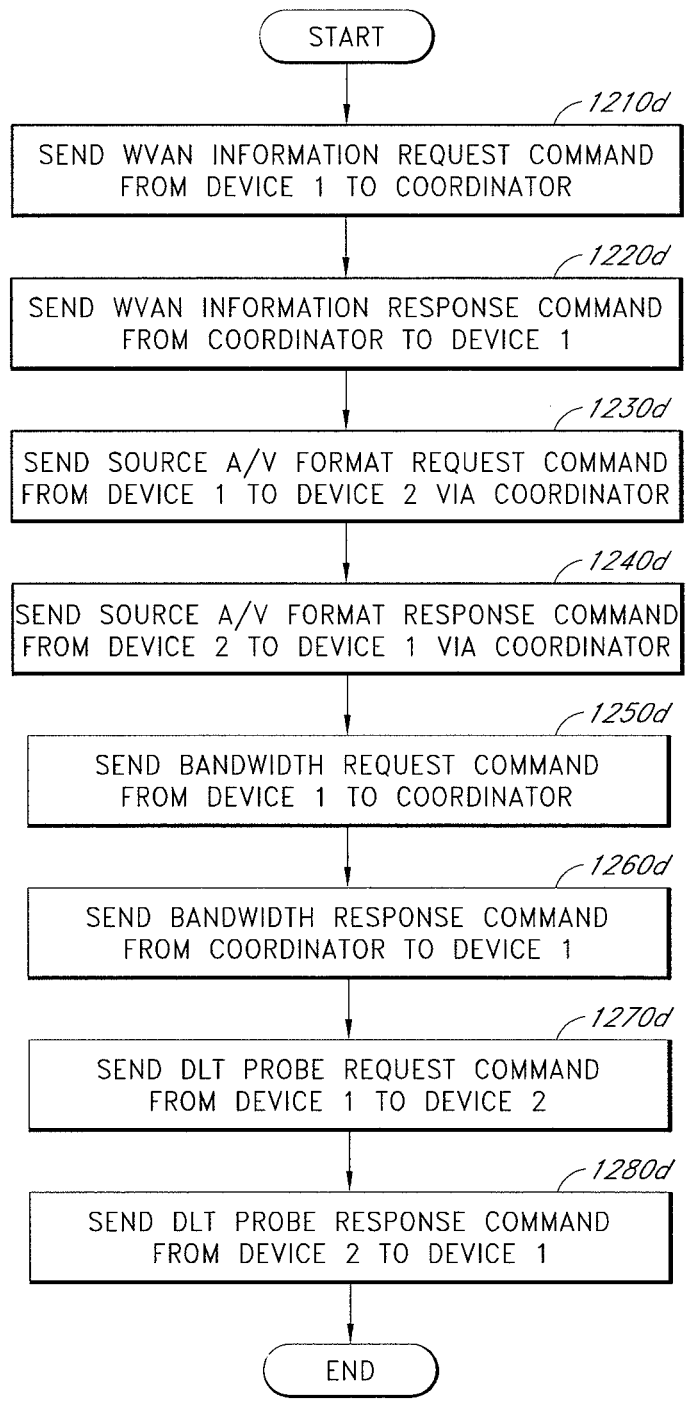
FIG. 12D is a flowchart illustrating a functional module that is a portion of the block 1130 FIG. 11 for connecting two non-coordinator wireless devices, according to yet another embodiment.

FIG. 12D is a flowchart illustrating a functional module that is a portion of the block 1130 of FIG. 11 for connecting two non-coordinator devices for A/V transmission, according to yet another embodiment. In the illustrated embodiment, one of the devices is a device 1 serving as a sink and originator device (e.g., a display, an amplifier; or the second device 730 of FIG. 7). The other of the devices is a device 2 serving as a source and destination device (e.g., a DVD player, a set-top box, etc; or the first device 720 of FIG. 7). In establishing a wireless connection, the devices use a coordinator in the wireless network. In other embodiments, some blocks can be omitted, or two or more blocks can be combined.

In block 1210d, the device 1 sends a WVAN information request command to the coordinator. The WVAN information request command can have the format described above in connection with FIG. 8A. In block 1220d, the coordinator sends a WVAN information response command to the device 1. The WVAN information response command can have the format described above in connection with FIG. 8B.

In block 1230*d*, the device 1 sends a source A/V format capability request command to the device 2 via the coordinator. The source A/V format capability request command can have the format described above in connection with FIG. 10A. In block 1240*d*, the device 2 sends a source A/V format capability response command to the device 1 via the coordinator. The source A/V format capability response command can have the format described above in connection with FIG. 10B. In certain embodiments, if the coordinator has the requested source A/V Format information, the coordinator can send a source A/V format response command to the device 1 without forwarding the source A/V format capability request command to the device 2.

In block 1250*d*, the device 1 sends a bandwidth request command to the coordinator. Then, in block 1260*d*, the coordinator sends a bandwidth response command to the device 1. In block 1270*d*, the device 1 sends a DLT probe request command to the device 2. In block 1280*d*, the device 2 then sends a DLT probe response command to the device 1.

3. Optimization of Request/Response Exchanges

Figure 13:
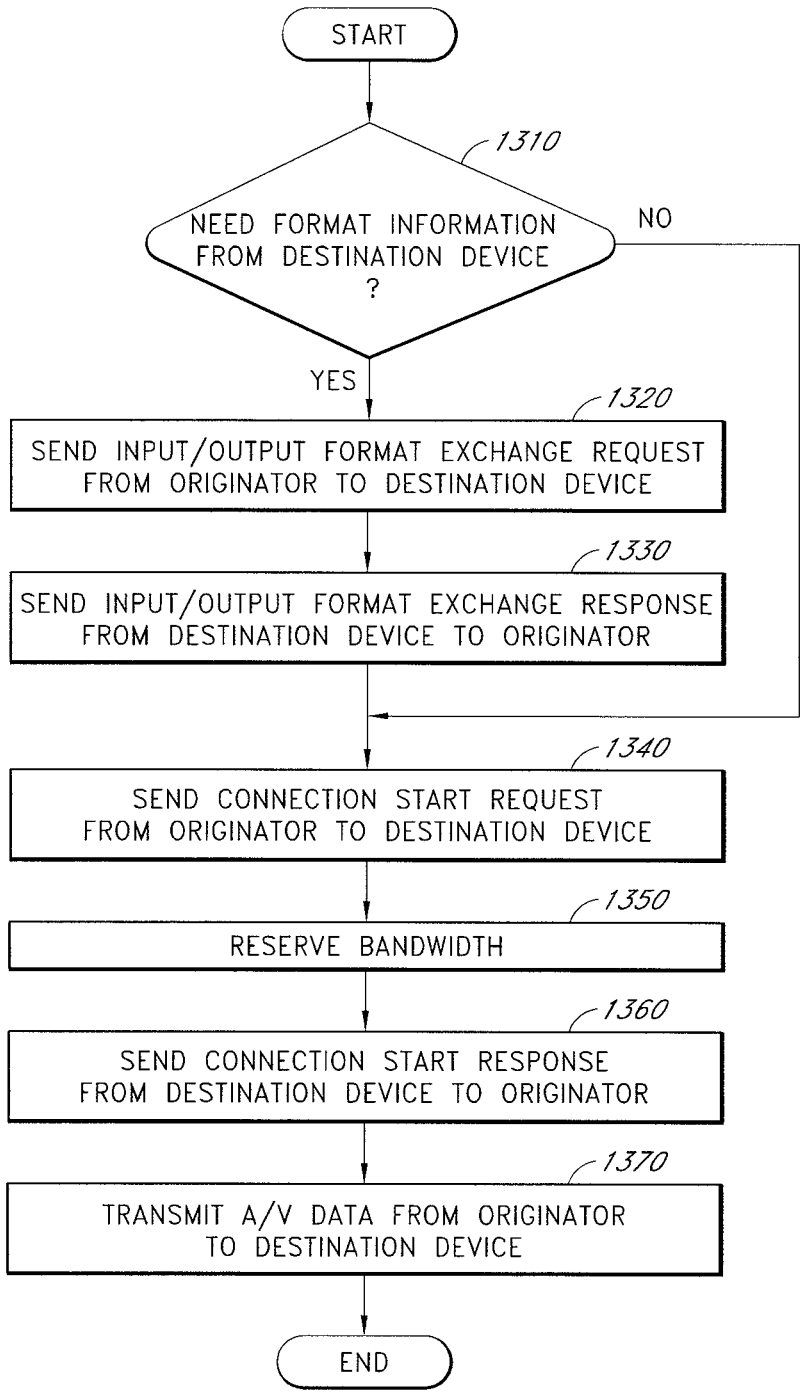
FIG. 13 is a flowchart illustrating a method of wirelessly transmitting audio/video data between devices according to another embodiment.

FIG. 13 illustrates a method of establishing a wireless A/V communication between devices according to another embodiment. In certain embodiments, some blocks can be omitted, or two or more blocks can be combined.

The illustrated method can be implemented with two devices. One of the two devices can be an originator. The other of the two devices can be a destination device. In the illustrated embodiment, the originator is a source, and the destination device is a sink. In another embodiment, the originator can be a sink and the destination device can be a source.

In one embodiment, one of the two devices can be a coordinator, and the other can be a non-coordinator device. In the illustrated embodiment, the originator is a non-coordinator, and the destination device is a coordinator. In another embodiment, each of the two devices can be a non-coordinator device. In yet another embodiment, the method can be implemented with a wireless system including a coordinator, a first device, and a second device. The first and second devices are non-coordinator devices. In such an embodiment, any two of the devices in the system can be connected to each other for A/V transmission.

At block 1310, it is determined whether the originator needs to acquire the format information of the destination device directly from the destination device. For example, if the originator already has the format information of the destination device, the originator does not need to acquire the information again. The originator may have acquired the format information of the destination device from a previous A/V transmission with the destination device, and may keep the information in its storage. In another embodiment, the originator can have the destination device's format information which has been pre-stored when manufactured. In some embodiments, a coordinator can be configured to store the format information of all devices in the network. In such embodiments, when two non-coordinator devices attempt to connect to each other for A/V transmission, the originator can acquire the format information of the destination device from the coordinator. If the answer is yes at block 1310, the process goes to block 1320. Otherwise, the process goes to block 1340 without exchanging input output (I/O) format exchange request/response between the devices.

At block 1320, the originator transmits an input/output (I/O) format exchange request to the destination device. The I/O format exchange request can include a request for the format information of the destination device. The format information can contain data indicative of the type of A/V data format (e.g., 1080p or 1080i for video format) which the destination device can use. At block 1330, the destination device transmits an I/O format exchange response to the originator. The I/O format exchange request can include the format information of the destination device.

Then, at block 1340, the originator transmits a connection start request to the destination device. The term "connection start request" may also be referred to as a "connect request." At block 1350, a bandwidth is reserved for A/V transmission between the originator and the destination device. In the illustrated embodiment, the bandwidth is allocated by the destination device (which is a coordinator in the illustrated embodiment). In other embodiments, a coordinator, which is not one of the two devices for A/V transmission, can be configured to allocate the bandwidth upon a request from one of the two devices. At block 1360, the destination device transmits a connection start response to the originator. The term "connection start response" may also be referred to as a "connect response." At block 1370, A/V data is transmitted from the originator (source) to the destination device (sink). The method described above allows the devices to avoid sending I/O format exchange request/response if the originator already has the format information required for A/V transmission or can acquire the information from a third device (e.g., a coordinator) other than the destination device. Thus, an effective use of the wireless channel, particularly a low-rate channel, is possible.

Figure 14:
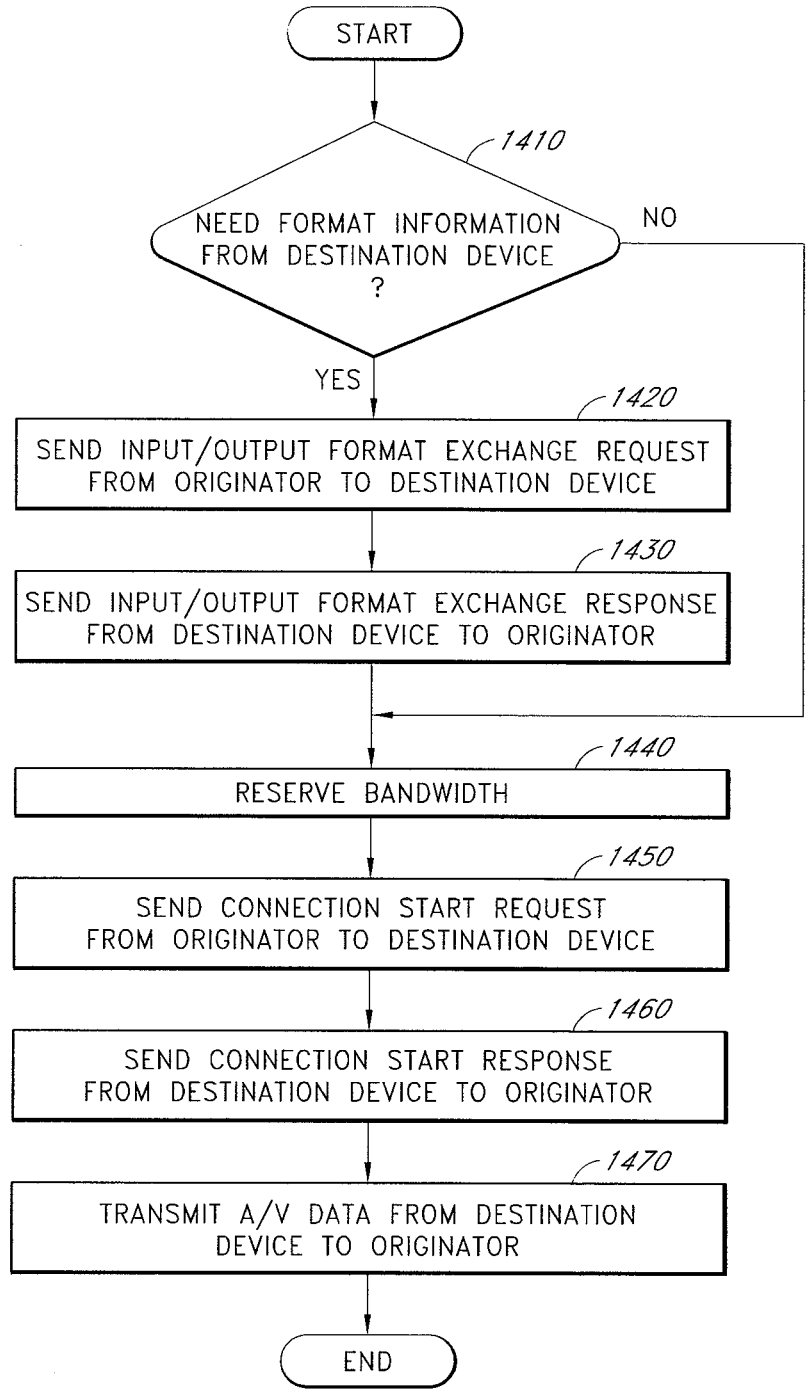
FIG. 14 is a flowchart illustrating a method of wirelessly transmitting audio/video data between devices according to yet another embodiment.

FIG. 14 illustrates a method of establishing a wireless A/V communication between devices according to another embodiment. In certain embodiments, some blocks can be omitted, or two or more blocks can be combined.

The illustrated embodiment can be implemented with a wireless system including a coordinator and two or more non-coordinator devices. Two of the non-coordinator devices (an originator and a destination device) in the system are connected to each other for A/V transmission. In the illustrated embodiment, the originator is a sink, and the destination device is a source. In another embodiment, the originator can be a source, and the destination device can be a sink. In other embodiments, the method can be implemented with two devices to be connected for A/V transmission. Each of the two devices can be a non-coordinator device. In another embodiment, one of the two devices can be a coordinator, and the other can be a non-coordinator device.

Referring to FIG. 14, at block 1410, it is determined whether the originator needs to acquire the format information directly from the destination device. Unless the originator already has the format information of the destination device, or can acquire the information from another device (e.g., a coordinator), as described above with respect to block 1310 of FIG. 13, the answer is yes. If yes at block 1410, the process goes to block 1420. Otherwise, the process goes to block 1440 without exchanging format exchange request/response between the devices.

At block 1420, the originator transmits an input/output (I/O) format exchange request to the destination device. The I/O format exchange request can include a request for the format information of the destination device. The format information can contain information on the type of A/V data format (e.g., 1080p or 1080i for video format) that the destination device can support. At block 1430, the destination device transmits an I/O format exchange response to the originator. The I/O format exchange request can include the format information of the destination device.

At block 1440, a bandwidth is reserved for A/V communication between the originator and the destination device. In the illustrated embodiment, the coordinator allocates a bandwidth upon a request from the originator. In other embodiments, the coordinator can allocate a bandwidth upon a request from the destination device.

At block 1450, the originator transmits a connection start request to the originator. At block 1460, the destination device transmits a connection start response to the originator. At block 1470, A/V data is transmitted from the destination device (source) to the originator (sink). This method allows the devices to avoid sending I/O format exchange request/response if the originator already has the format information needed for A/V transmission or can acquire the information from another device (e.g., the coordinator). Thus, an effective use of the wireless channel, particularly a low-rate channel, is possible.

Referring to FIG. 15A, one embodiment of an I/O format exchange request command frame 1500A is described below. The illustrated I/O format exchange request command frame 1500A includes a PHY/MAC header 1501*a*, an audio/video control (AV/C) header 1502*a*, and a payload 1503*a*.

The PHY/MAC header 1501*a* can include a source identification field 1511*a* and a destination identification field 1512*a*. The source identification field 1511*a* can include the identification information of a device which sends the I/O format exchange request 1500A (hereinafter "format request sender"). The destination identification field 1512*a* can include the identification information of a device which receives the I/O format exchange request 1500A (hereinafter "format request receiver").

The AV/C header 1502*a* can include a version field (4 bits) 1521*a*, a port number field (8 bits) 1522*a*, a length field (12 bits) 1523*a*, and an opcode field (8 bits) 1524*a*.

The values of the version field 1521*a* can be as listed in Table 1. The port number field 1522*a* can include a port number used for A/V transmission. The length field 1523*a* is used to indicate the total length of the AV/C payload 1503*a*. The opcode field 1524*a* serves to indicate the type of AV/C control command frame (e.g., I/O format exchange request/response, connection start request/response, and the like). In the frame of FIG. 15A, the opcode field 1524*a* includes a code indicating that the command frame is an I/O format exchange request.

The payload 1503*a* includes an information type field (8 bits) 1531*a* and a format information field (8 bits) 1532*a*. The information type field 1531*a* includes data indicative of the type of information in the format information field 1532*a*. The format information field 1532*a* can include the format information of the format request sender. In one embodiment in which the format request sender is a sink, the format information field 1532*a* can include the E-EDID data structure information of the format request sender. In another embodiment in which the format request sender is a source, the format information field 1532*a* can include the A/V output format information of the format request sender.

Referring to FIG. 15B, one embodiment of an I/O format exchange response command frame 1500B is described below. The illustrated I/O format exchange response command frame 1500B can include a PHY/MAC header 1501*b*, an audio video control (AV/C) header 1502*b*, and a payload 1503*b*. The configurations of the PHY/MAC header 1501*b* and an audio video control (AV/C) header 1502*b* can be as described above with respect to those of the I/O format exchange request command frame 1500A except that the headers 1501*b*, 1502*b* include the format response sender's information.

The payload 1503*b* can include an information type field (8 bits) 1531*b* and a format information field (8 bits) 1532*b*. The information type field 1531*b* includes data indicative of the type of information in the format information field 1532*b*. The format information field 1532*b* can include the format information of the format response sender. In one embodiment in which the format response sender is a source, the format information field 1532*b* can include the A/V output format information of the format response sender. In another embodiment in which the format response sender is a sink, the format information field 1532*b* can include the E-EDID data structure information of the format response sender.

Figure 16A:
FIG. 16A is a frame format for one embodiment of a connection start request command frame.

Referring to FIG. 16A, one embodiment of a connection start request command frame 1600A is described below. The illustrated connection start request command frame 1600A includes a PHY/MAC header 1601*a*, an audio/video control (AV/C) header 1602*a*, and a payload 1603*a*.

The PHY/MAC header 1601*a* can include a source identification field 1611*a* and a destination identification field 1612*a*. The source identification field 1611*a* can include the identification information of a device which sends the connection start request 1600A (hereinafter "connection request sender"). The destination identification field 1612*a* can include the identification information of a device which receives the connection start request 1600A (hereinafter "connection request receiver").

The AV/C header 1602*a* can include a version field 1621*a*, a port number field 1622*a*, a length field 1623*a*, and an opcode field 1624*a*. The values of the version field 1621*a* can be as listed in Table 1. The port number field 1622*a* can include a port number used for A/V transmission. The length field 1623*a* is used to indicate the total length of the AV/C payload 1603*a*. The opcode field 1624*a* serves to indicate the type of AV/C control command frame (e.g., I/O format exchange request/response, connection start request/response, and the like). In the frame 1600A of FIG. 16A, the opcode field 1624*a* includes a code indicating that the command frame is a connection start request.

The payload 1603*a* includes a process identification (PID) field 1631*a*, a reserved (R) field 1632*a*, a video port (VP) field 1633*a*, an audio port (AP) field 1634*a*, a destination port field 1635*a*. The PID field 1631*a* includes data used to identify a video or audio stream. The R field 1632*a* is reserved for future use. The VP field 1633*a* can be set to 1 if the destination port field 1635*a* is to be used for video data, or otherwise 0. The AP field 1634*a* can be set to 1 if the destination port field 1635*a* is to be used for audio data, or otherwise 0. The destination port field 1635*a* can include data indicative of a destination port for the A/V transmission.

Figure 16B:
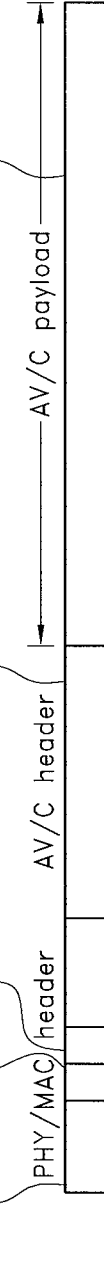
FIG. 16B is a frame format for one embodiment of a connection start response command frame.

Referring to FIG. 16B, one embodiment of a connection start response command frame 1600B is described below. The illustrated connection start request command frame 1600B includes a PHY/MAC header 1601*b*, an audio/video control (AV/C) header 1602*b*, and a payload 1603*b*. The configurations of the PHY/MAC header 1601*b* and an audio video control (AV/C) header 1602*b* can be as described above with respect to those of the connection start request command frame 1600A except that the headers 1601*b*, 1602*b* include the connection response sender's information.

The payload 1603*b* includes a result code field 1631*a*, a process identification (PID) field 1632*b*, a video port (VP) field 1633*b*, an audio port (AP) field 1634*b*, a destination port field 1635*b*, a source port field 1636*b*, and a reserved field 1637*b*. The result code field 1631*b* includes a code indicative of whether a connection request has been accepted or rejected by the response sender. The PID field 1631*b* includes data used to identify a video or audio stream. The VP field 1633*b* can be set to 1 if the destination port field 1635*b* is to be used for video data, or otherwise 0. The AP field 1634*b* can be set to 1 if the destination port field 1635*b* is to be used for audio data, or otherwise 0. The destination port field 1635*b* can include data indicative of a destination port for the connection. The source port field 1636*b* can include data indicative of a source port for the A/V transmission. The reserved field 1637*b* is reserved for future use. In FIGS. 15A-16B, only exemplary frame formats are shown. A skilled artisan will appreciate that various other configurations of frame formats can also be used with the methods described in connection with FIGS. 13 and 14.

In the embodiments described above, command frames are described and/or shown with exemplary numbers of bits for fields. A skilled artisan will appreciate that the numbers of bits can vary widely depending on the system requirements.

The wireless systems and methods of the embodiments described above permit an effective and accurate connection control between wireless devices in the systems. The systems and methods improve WVAN network throughput by reducing the number of control message exchanges among devices in the WVAN network. In addition, the coordinator of the embodiments serves both as an audio video control (AV/C) and a MAC layer coordinator, and thus minimizes control information exchange in the system.

The foregoing description is that of embodiments of the invention and various changes, modifications, combinations and sub-combinations can be made without departing from the spirit and scope of the invention, as defined by the appended claims.

What is claimed is:

1. A method of wireless communication of uncompressed audiovisual data, the method comprising:
    transmitting at least one connection control information request from a first device to a second device in a wireless communication network before transmission of audio video (A/V) data between the first device to the second device, wherein the connection control information request comprises connection control information of the first device, and wherein the connection control information comprises a frame for device capability information and a frame for A/V format capability information, wherein the device capability information comprises one or more of device category information and wireless type information, wherein the wireless type information comprises wireless high rate channel information comprising fields for wireless capability for one or more of receiver device support and transmitter device support;
    transmitting at least one connection control information response from the second device to the first device; and
    transmitting uncompressed audiovisual data to or from one of the first and second devices.

2. The method of claim 1, wherein the first device is a non-coordinator device, and wherein the second device is a coordinator.

3. The method of claim 2, further comprising generating the connection control information response at the second device, and wherein transmitting the uncompressed audiovisual data comprises transmitting the audiovisual data between the first and second devices.

4. The method of claim 2, further comprising storing the connection control information of the first device at the second device.

5. The method of claim 4, wherein the wireless communication network further comprises a third device which is a non-coordinator device, and wherein the method further comprises transmitting the stored connection control information of the first device to the third device.

6. The method of claim 2, wherein the wireless communication network further comprises a third device which is a non-coordinator device, and wherein transmitting the uncompressed audiovisual data comprises transmitting the audiovisual data between the first and third devices.

7. The method of claim 6, further comprising generating the connection control information response at the second device.

8. The method of claim 6, further comprising:
    transmitting the connection control information request from the second device to the third device;
    generating the connection control information response at the third device; and
    transmitting the connection control information response from the third device to the second device.

9. The method of claim 8, wherein the first device is a sink and wherein the third device is a source.

10. The method of claim 1, wherein the first device is a coordinator, wherein the second device is a non-coordinator device, and wherein transmitting the uncompressed audiovisual data comprises transmitting the audiovisual data between the first and second devices.

11. The method of claim 1, wherein the device capability information comprises subunit information including a number of subunits associated with the device.

12. The method of claim 11, wherein the subunit information further comprises device function filtering information.

13. The method of claim 1, wherein A/V formats to be used by the first device and the second device are negotiated before a connection begins between the first device and the second device.

14. The method of claim 1, wherein the connection control information further comprises association information, wireless video area network (WVAN) information, bandwidth information, A/V stream start, stop or pause command information, and device control information.

15. The method of claim 1, wherein the frame for device capability information comprises a wireless video area network (WVAN) information request command frame.

16. The method of claim 15, wherein the frame for A/V format capability comprises an A/V format capability request command frame.

17. The method of claim 16, wherein the frame for A/V format capability information includes fields for A/V format type, A/V format size and A/V source format capability data.

18. The method of claim 1, wherein the device capability information further comprises device subunit type information.

19. The method of claim 1, wherein the frame for device capability information comprises a device name.

20. The method of claim 1, further comprising:
    transmitting at least one connection control information response from the second device to the first device in the wireless communication network, wherein the connection control information response comprises a frame including a plurality of device capability information fields for each of a plurality of devices.

21. The method of claim 20, wherein each of the plurality of device capability information fields comprise one or more of a length field, a device identification field, a version field, a wireless type field, a function filter field, and a subunit number field.

22. The method of claim 1, wherein the fields for wireless capability comprise fields for high rate wireless channel receiver support, high rate wireless channel transmitter support, and high rate wireless channel transceiver support.

23. The method of claim 1, wherein the wireless high rate channel information comprises a field for no high rate wireless channel support.

24. The method of claim 1, wherein the wireless type information comprises type of high rate physical (PHY) layer supported.

25. The method of claim 24, wherein the type of high rate PHY layer supported comprises device support by a high rate receiver, a high rate transmitter or a high rate transceiver.

26. A method of wireless communication of uncompressed audiovisual data, the method comprising:
determining whether an originator needs to acquire device format capability information of a destination device directly from the destination device, wherein the format capability information comprises a frame including A/V source format capability that the destination device can support;
exchanging a connection control information request and a connection control information response between the originator and the destination device, wherein the device capability information comprises one or more of device category information and wireless type information, wherein the wireless type information comprises wireless high rate channel information comprising fields for wireless capability for one or more of receiver device support and transmitter device support;
exchanging a format capability information request and a format capability information response between the originator and the destination device if the originator needs to acquire the format capability information of the destination device directly from the destination device;
exchanging a connection start request and a connection start response between the originator and the destination device; and
transmitting audiovisual data between the originator and the destination device.

27. The method of claim 26, wherein exchanging the format capability information request and the format capability information response comprises:
transmitting the format capability information request from the originator to the destination device; and
transmitting the format capability information response from the destination device to the originator in response to the format capability information request.

28. The method of claim 26, wherein exchanging the connection start request and the connection start response comprises: transmitting the connection start request from the originator to the destination device; and transmitting the connection start response from the destination device to the originator in response to the connection start request.

29. The method of claim 28, further comprising reserving a bandwidth for transmitting the audiovisual data after exchanging the format capability information request and the format capability information response and before transmitting the connection start response.

30. The method of claim 26, wherein one of the originator and the destination device is a coordinator and the other of the originator and the destination device is a non-coordinator device.

31. The method of claim 26, wherein each of the originator and the destination device is a non-coordinator device.

32. The method of claim 26, wherein the connection start request does not include format capability information, and wherein the connection start response does not include format capability information.

33. The method of claim 26, wherein A/V formats to be used by the originator and the destination device are negotiated before a connection begins between the originator and the destination device.

34. The method of claim 26, wherein the format capability information comprises Enhanced Extended Display Identification (E-EDID) information.

35. A wireless system for wireless communication of uncompressed audiovisual data, the system comprising:
a transmitter transmitting that transmits at least one connection control information request to a device in a wireless communication network before transmission of audio video (A/V) data between the transmitter to the device, wherein the connection control information request comprises connection control information of the first device, and wherein the connection control information comprises a frame for device capability information and a frame for A/V format capability information, wherein the device capability information comprises one or more of device category information and wireless type information, wherein the wireless type information comprises wireless high rate channel information comprising fields for wireless capability for one or more of receiver device support and transmitter device support;
wherein the device transmits at least one connection control information response to the transmitter, and
wherein the transmitter transmits uncompressed audiovisual data to the device.

36. A wireless system for wireless communication of uncompressed audiovisual data, the system comprising:
a receiver that receives at least one connection control information request from a device in a wireless communication network before transmission of audio video (A/V) data between the device to the receiver, wherein the connection control information request comprises connection control information of the first device, and wherein the connection control information comprises a frame for device capability information and a frame for A/V format capability information, wherein the device capability information comprises one or more of device category information and wireless type information, wherein the wireless type information comprises wireless high rate channel information comprising fields for wireless capability for one or more of receiver device high rate channel support and transmitter device high rate channel support;
wherein the receiver communicates a connection control information response to the device, and
wherein the receiver receives uncompressed audiovisual data from the device.

* * * * *